United States Patent
Yun et al.

(10) Patent No.: US 10,629,369 B2
(45) Date of Patent: Apr. 21, 2020

(54) WIRELESS POWER TRANSMISSION DEVICE FOR TRANSMITTING POWER USING MAGNETIC FIELD AND ELECTRIC FIELD, AND WIRELESS POWER RECEIVING DEVICE FOR RECEIVING POWER FROM THE WIRELESS POWER TRANSMISSION DEVICE

(71) Applicant: Electronics and Telecommunications Research Institute, Daejeon (KR)

(72) Inventors: Je Hoon Yun, Daejeon (KR); Jung Ick Moon, Daejeon (KR); Sang-Won Kim, Daejeon (KR); Seong-Min Kim, Daejeon (KR); Dong Won Jang, Daejeon (KR); Sang Bong Jeon, Daejeon (KR); In Kui Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 32 days.

(21) Appl. No.: 15/799,854

(22) Filed: Oct. 31, 2017

(65) Prior Publication Data

US 2018/0130599 A1    May 10, 2018

(30) Foreign Application Priority Data

Nov. 4, 2016  (KR) .................. 10-2016-0146869
Oct. 16, 2017  (KR) .................. 10-2017-0133934

(51) Int. Cl.
  *H01F 38/14*  (2006.01)
  *H02J 50/10*  (2016.01)
  *H02J 50/12*  (2016.01)

(52) U.S. Cl.
  CPC .............. *H01F 38/14* (2013.01); *H02J 50/10* (2016.02); *H02J 50/12* (2016.02)

(58) Field of Classification Search
  CPC ............ H01F 38/14; H02J 50/12; H02J 50/10
  (Continued)

(56) References Cited

U.S. PATENT DOCUMENTS 8,466,375 B2  6/2013  Cho et al.
9,246,336 B2  1/2016  Kurs et al.
(Continued)

FOREIGN PATENT DOCUMENTS

| KR | 101584800 B1 | 1/2016 |
| WO | 2011138507 A2 | 11/2011 |
| WO | 2012166124 A1 | 12/2012 |

OTHER PUBLICATIONS

Andre Kirs, et al. "Wireless Power Transfer via Strongly Coupled Magnetic Resonances", Science 317, 83 (2007), 2 Pages, American Association for the Advancement of Science, Washington DC, USA.
(Continued)

*Primary Examiner* — Hal Kaplan
(74) *Attorney, Agent, or Firm* — William Park & Associates Ltd.

(57) ABSTRACT

Provided are a wireless power transmission device for transmitting power to a wireless power receiving device and the wireless power receiving device for receiving the power from the wireless power transmission device. The wireless power transmission device includes a first coil provided in a first direction; a second coil provided in a second direction that is perpendicular to the first direction, and connected to both ends of the first coil; and a voltage source configured to supply voltage to the first coil and the second coil. The first coil and the second coil may generate an electric field and a magnetic field in response to the voltage being supplied from the voltage source.

18 Claims, 21 Drawing Sheets

(58) Field of Classification Search
USPC .......................................................... 307/104
See application file for complete search history.

(56) References Cited

U.S. PATENT DOCUMENTS

| | | |
|---|---|---|
| 2013/0127253 A1 | 5/2013 | Stark et al. |
| 2013/0181541 A1 | 7/2013 | Karalis et al. |
| 2013/0257173 A1 | 10/2013 | Saitoh |
| 2015/0108850 A1 | 4/2015 | Cho et al. |
| 2016/0036245 A1 | 2/2016 | Chang et al. |
| 2016/0049827 A1* | 2/2016 | Tilvis ................. H01F 27/28 320/108 |

OTHER PUBLICATIONS

Jia-Sheng Hong, and Michael J. Lancaster, "Couplings of Microstrip Square Open-Loop Resonators for Cross-Coupled Planar Microwave Filters", IEEE Transactions on Microwave Theory and Techniques, vol. 44, No. 12, Dec. 1996. p. 2099-2109.

Maja Skiljo, Zoran Blazevic, "Increasing the Radiation Efficiency and Resistance of Electrically Small Spherical Helical Antenna for Wireless Power Transfer", 2013 21st International Conference on Software, Telecommunications and Computer Networks—(SoftCOM 2013), IEEE, Sep. 18-20, 2013, Primosten, Croatia.

S. Rasti Boroujeni, M. Shahabadi and J. Rashed-Mohassel, "Investigation of electric and magnetic coupling between two helical resonators of a wireless power transfer system", Electronics Letters, Feb. 18, 2016, vol. 52 No. 4 pp. 312-314.

Y. Kim and H. Ling, "Investigation of coupled mode behavior of electrically small meander antennas" Electronics Letters Nov. 8, 2007 vol. 43 No. 23, 2 pages.

\* cited by examiner

310

320

510

520

1210

1220

WIRELESS POWER TRANSMISSION DEVICE FOR TRANSMITTING POWER USING MAGNETIC FIELD AND ELECTRIC FIELD, AND WIRELESS POWER RECEIVING DEVICE FOR RECEIVING POWER FROM THE WIRELESS POWER TRANSMISSION DEVICE

CROSS-REFERENCE TO RELATED APPLICATION(S)

This application claims the priority benefit of Korean Patent Application No. 10-2016-0146869 filed on Nov. 4, 2016, and Korean Patent Application No. 10-2017-0133934, filed on Oct. 16, 2017, in the Korean Intellectual Property Office, the disclosure of which is incorporated herein by reference for all purposes.

TECHNICAL FIELD

Example embodiments relate to a wireless power transmission, and more particularly, to a wireless power transmission device for transmitting power using all of a magnetic field and an electric field.

Example embodiments relate to a wireless power reception, and more particularly, to a wireless power receiving device for receiving power from a wireless power transmission device that transmits the power using all of a magnetic field and an electric field.

RELATED ART

Wireless power transmission technology refers to technology for transmitting power without using wires. Various schemes, for example, an electromagnetic wave scheme, a magnetic induction scheme, a magnetic resonance scheme, and an electric resonance scheme, may transmit power wirelessly.

The magnetic resonance scheme transmits power using resonance according to coupling of a magnetic field between a wireless power transmission device and a wireless power receiving device. The electric resonance scheme transmits power using resonance according to coupling of an electric field between the wireless power transmission device and the wireless power receiving device.

In the wireless power transmission technology according to the related art, interference may occur due to a relatively great amount of space radiation. In addition, in the case of using the wireless power transmission technology according to the related art, a power transmission distance may be enhanced only by increasing an amount of space radiation. Accordingly, there is a need to decrease an amount of space radiation and to increase a power transmission distance that are issues found in the wireless power transmission technology according to the related art.

DESCRIPTION

Solutions

According to an aspect of at least one example embodiment, there is provided a wireless power transmission device including a first coil provided in a first direction; a second coil provided in a second direction that is perpendicular to the first direction, and connected to both ends of the first coil; and a voltage source configured to supply voltage to the first coil and the second coil. The first coil and the second coil generate an electric field and a magnetic field in response to the voltage being supplied from the voltage source.

The first coil may include a conductive line that is wound a plurality of turns in the first direction, and the second coil may include a conductive line that is wound a plurality of turns toward a center of the first coil in the second direction.

The first coil may include a conductive line that is wound a plurality of turns in a circular shape in the first direction, and the second coil may include a conductive line that is wound a plurality of turns in a circular shape toward a center of the first coil in the second direction.

The first coil may include a conductive line that is wound a plurality of turns in a rectangular shape in the first direction, and the second coil may include a conductive line that is wound a plurality of turns in a rectangular shape toward a center of the first coil in the second direction.

The voltage source may be connected to the first coil and configured to supply the voltage to the first coil and the second coil through the first coil.

The wireless power transmission may further include a voltage supply loop separate from the first coil and the second coil and provided on a plane parallel to the second coil. The voltage source may be connected to the voltage supply loop and configured to supply the voltage to the voltage supply loop.

The voltage supply loop may be configured to generate the magnetic field and to indirectly supply the voltage to the first coil and the second coil in response to the voltage being supplied from the voltage source.

The first coil may include a gap area that is an area in which an interval between conductive lines constituting the first coil is relatively greater than an interval between conductive lines provided in another portion.

The voltage source may be connected to a conductive line which configures the gap area.

According to an aspect of at least one example embodiment, there is provided a wireless power receiving device including a first coil provided in a first direction; a second coil provided in a second direction that is perpendicular to the first direction, and connected to both ends of the first coil; and a load configured to be supplied with voltage from the first coil and the second coil. The first coil and the second coil are configured to supply the voltage to the load in response to the voltage being received from the wireless power transmission device.

The first coil may includes a conductive line that is wound a plurality of turns in the first direction, and the second coil may include a conductive line that is wound a plurality of turns toward a center of the first coil in the second direction.

The first coil may include a conductive line that is wound a plurality of turns in a circular shape in the first direction, and the second coil may include a conductive line that is wound a plurality of turns in a circular shape toward a center of the first coil in the second direction.

The first coil may include a conductive line that is wound a plurality of turns in a rectangular shape in the first direction, and the second coil may include a conductive line that is wound a plurality of turns in a rectangular shape toward a center of the first coil in the second direction.

The load may be connected to the first coil and configured to be supplied with the voltage from the first coil and the second coil through the first coil The wireless power receiving device may further include a voltage receiving loop separate from the first coil and the second coil and provided on a plane parallel to the second coil. The load may be connected to the voltage receiving loop and configured to be supplied with the voltage from the voltage receiving loop.

The voltage receiving loop may be configured to be supplied with the voltage from the first coil and the second coil in response to the first coil and the second coil receiving the power from the wireless power transmission device and generating a magnetic field.

The first coil may include a gap area that is an area in which an interval between conductive lines constituting in the first coil is relatively greater than an interval between conductive lines provided in another portion.

The load may be connected to a conductive line which configures the gap area.

DETAILED DESCRIPTION

Hereinafter, example embodiments are described with reference to the accompanying drawings.

Figure 1:
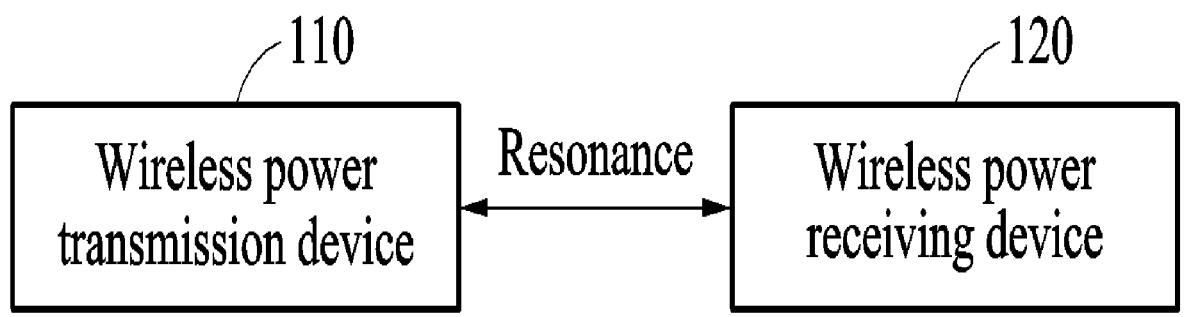
FIG. 1 is a diagram illustrating an example of a wireless power transmission device and a wireless power receiving device according to an example embodiment.

FIG. 1 is a diagram illustrating an example of a wireless power transmission device and a wireless power receiving device according to an example embodiment.

FIG. 1 illustrates a wireless power transmission device 110 and a wireless power receiving device 120.

The wireless power transmission device 110 refers to a device that transmits power to the wireless power receiving device 120. The wireless power transmission device 110 may use an electric field and a magnetic field to transmit the power. The wireless power transmission device 110 includes a coil and a voltage source.

The wireless power receiving device 120 refers to a device that receives the power from the wireless power transmission device 110. The wireless power transmission device 120 may use an electric field and a magnetic field to receive the power. The wireless power receiving device 120 includes a coil and a load.

Once the power is supplied from the voltage source of the wireless power transmission device 110 to the coil, the coil of the wireless power transmission device 110 may generate the electric field and the magnetic field. The coil of the wireless power transmission device 110 and the coil of the wireless power receiving device 120 may resonate. The wireless power transmission device 110 may transmit the power to the wireless power receiving device 120 through the resonance.

Here, the resonance includes a resonance according to a magnetic field coupling and a resonance according to an electric field coupling. That is, the power may be transmitted or received between the wireless power transmission device 110 and the wireless power receiving device 120 through the mutual resonance.

Figure 2:
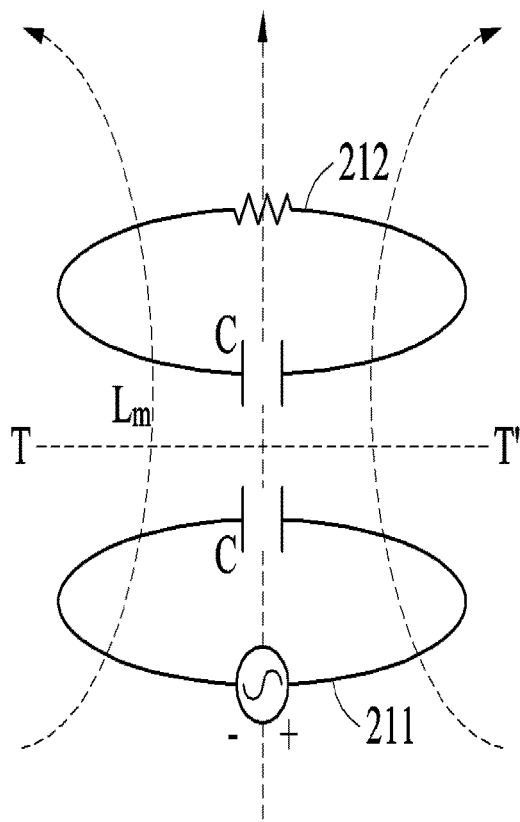
FIG. 2 illustrates examples of transmitting power using a magnetic field according to an example embodiment.
Figure 2:
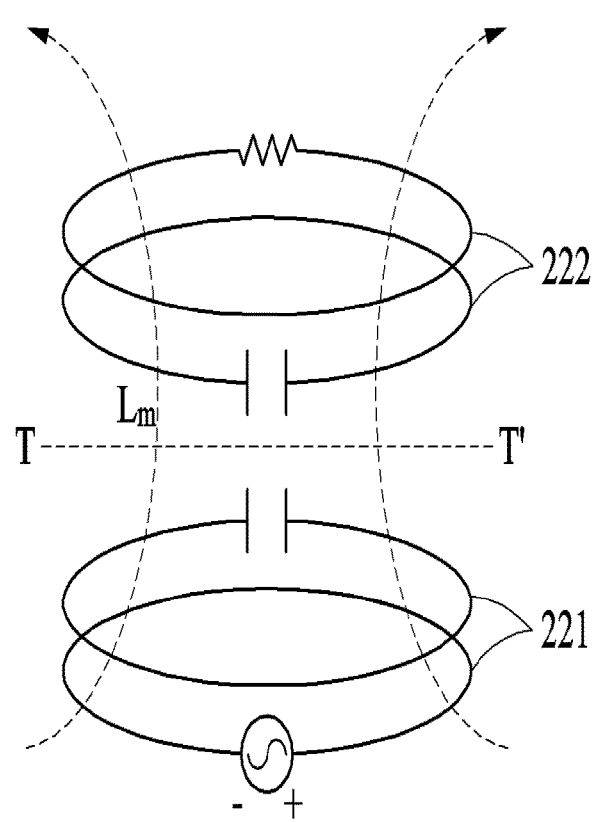

FIG. 2 illustrates examples of transmitting power using a magnetic field according to an example embodiment.

Referring to FIG. 2, a direct power supply scheme 210 includes a wireless power transmission device 211 and a wireless power receiving device 212, and an indirect power supply scheme 220 includes a wireless power transmission device 221 and a wireless power receiving device 222.

All of the direct power supply scheme 210 and the indirect power supply scheme 220 are examples of transmitting power using magnetic fields between the wireless power transmission devices 211 and 221 and the wireless power receiving devices 212 and 222, respectively. The wireless power transmission device 211, 221 may generate the magnetic field and may transmit the power through strong coupling power with the wireless power receiving device 212, 222. The wireless power transmission device 211, 221 and the wireless power reception device 212, 222 are in a loop structure.

In detail, a capacitor may be connected in series or in parallel to each of the wireless power transmission device 211, 221 and the wireless power receiving device 212, 222. Alternatively, a capacitance may be autonomously generated in each of the wireless power transmission device 211, 221 and the wireless power receiving device 212, 222. In FIG. 2, C denotes the capacitance according to the connected capacitor or the autonomously generated capacitance.

Each of the wireless power transmission device 211, 221 and the wireless power receiving device 212, 222 includes a self-inductance. The self-inductance may be represented as L. Also, the wireless power transmission device 211, 221 and the wireless power receiving device 212, 222 include a mutual inductance between the wireless power transmission device 211, 221 and the wireless power receiving device 212, 222. In FIG. 2, $L_m$ denotes the mutual inductance.

The wireless power receiving device 212, 222 and the wireless power transmission device 211, 221 have the same resonant frequency. Once voltage is supplied to the wireless power transmission device 211, 221, the wireless power receiving device 212, 222 receives the power through a resonance that occurs due to magnetic field coupling.

The wireless power transmission device 221 of the indirect power supply scheme 220 includes a separate voltage supply loop. A voltage source is connected to the voltage supply loop. As the voltage is supplied to the voltage supply loop, the voltage is supplied to the entire wireless power transmission device 221 indirectly through a magnetic induction. Also, the wireless power receiving device 222 includes a separate voltage receiving loop that is connected to a load. The voltage receiving loop may receive the power through a magnetic induction.

Figure 3:
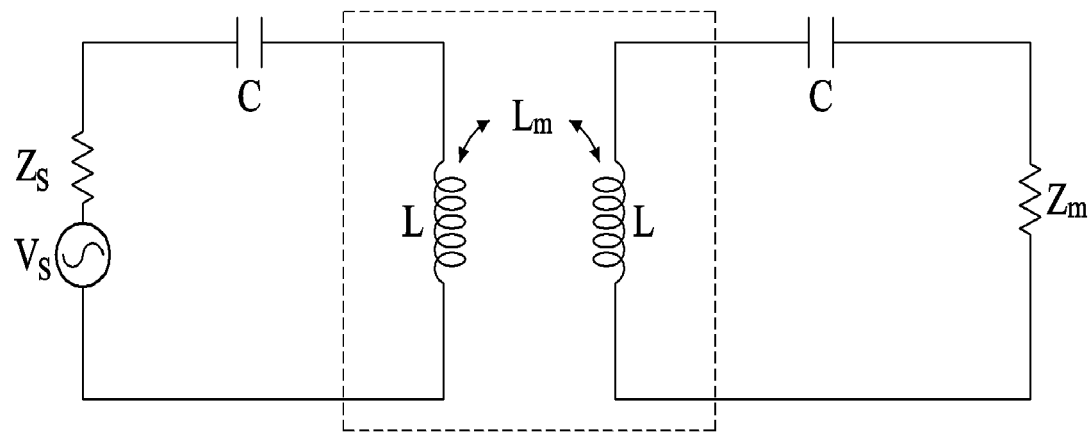
FIG. 3 illustrates examples of an equivalent circuit of FIG. 2 according to an example embodiment.
Figure 3:
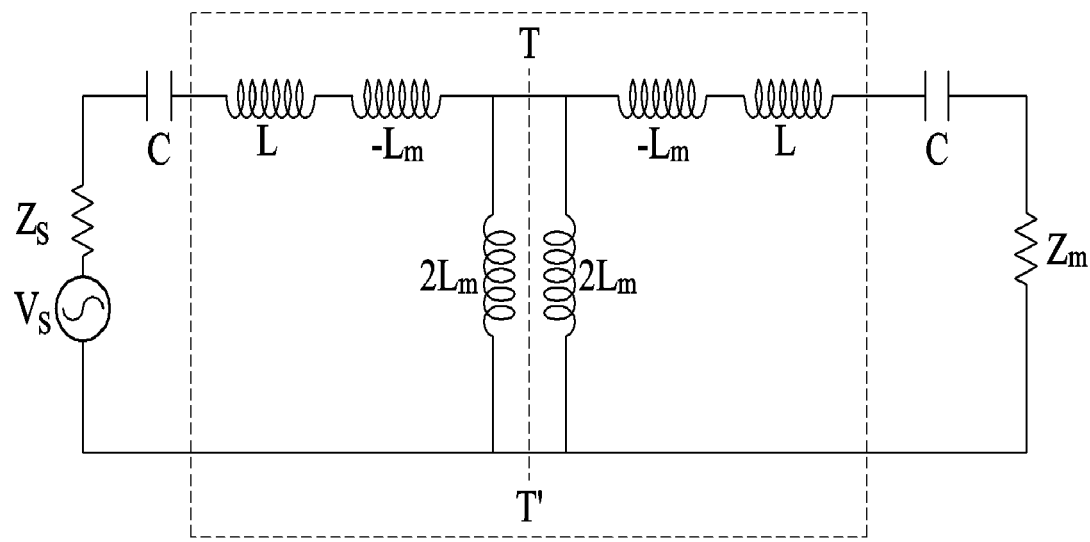

FIG. 3 illustrates examples of an equivalent circuit of FIG. 2 according to an example embodiment.

FIG. 3 illustrates examples of an equivalent circuit of the direct power supply scheme 210 of FIG. 2. FIG. 3 illustrates a first equivalent circuit 310 and a second equivalent circuit 320.

In the first equivalent circuit 310, it is assumed that voltage of the voltage source of the wireless power transmission device 211 is $V_s$, the impedance of the voltage source is $Z_s$, and impedance of the load of the wireless power receiving device 212 is $Z_m$. The second equivalent circuit 320 is an equivalent circuit that is converted based on mutual inductance $L_m$ of the first equivalent circuit 310.

When the wireless power transmission device 211 and the wireless power receiving device 212 are symmetric to each other, a magnetic field distribution of the second equivalent circuit 320 may be symmetric based on an interface T-T' since both circuits have the same absolute value of current based on the interface T-T'. Once the magnetic field distribution becomes symmetric, the second equivalent circuit 320 may be open or shorted on the interface T-T'.

Two resonances may occur based on whether the interface T-T' is open or shorted. Resonant frequencies according to the two resonances may be represented as Equation 1 and Equation 2, respectively.

$$f_{r1} = \frac{1}{2\pi\sqrt{C(L+L_m)}}$$ [Equation 1]

$$f_{r2} = \frac{1}{2\pi\sqrt{C(L-L_m)}}$$ [Equation 2]

In Equation 1 and Equation 2, $f_{r1}$ denotes a first resonant frequency and $f_{r2}$ denotes a second resonant frequency.

The first resonant frequency has a characteristic of opening the interface T-T', and the second resonant frequency has a characteristic of shorting the interface T-T'. That is, the interface T-T' may be open at the first resonant frequency and may be shorted the interface T-T' at the second resonant frequency.

According to Equation 1, the first resonant frequency is inversely proportional to a sum of the self-inductance L and the mutual inductance $L_m$. According to Equation 2, the second resonant frequency is inversely proportional to a difference between the self-inductance L and the mutual inductance $L_m$.

A magnetic coupling amount is determined based on a difference between the first resonant frequency and the second resonant frequency. According to an increase in the difference between the first resonant frequency and the second resonant frequency, the magnetic coupling amount increases. The magnetic coupling amount may be represented as $(f_{r2}^2 - f_{r1}^2)/(f_{r1}^2 + f_{r2}^2)$. Since the first resonant frequency and the second resonant frequency are affected by a relationship between the self-inductance and the mutual inductance, the magnetic coupling amount is also affected by the self-inductance and the mutual inductance. In detail, the magnetic coupling amount is determined based on a ratio of the mutual inductance to the self-inductance ($L_m/L$).

As the magnetic coupling amount increases, the wireless power transmission device 211 may efficiently perform wireless power transmission. In detail, if the magnetic coupling amount is great and a transmission distance is constant, the power transmission efficiency may be high. Also, if the magnetic coupling amount is great, a power transmission distance having a power transmission efficiency greater than or equal to a desired value may increase. Accordingly, in the case of transmitting the power using the magnetic field, the performance of the wireless power transmission device 211 is affected by the magnetic coupling amount.

Figure 4:
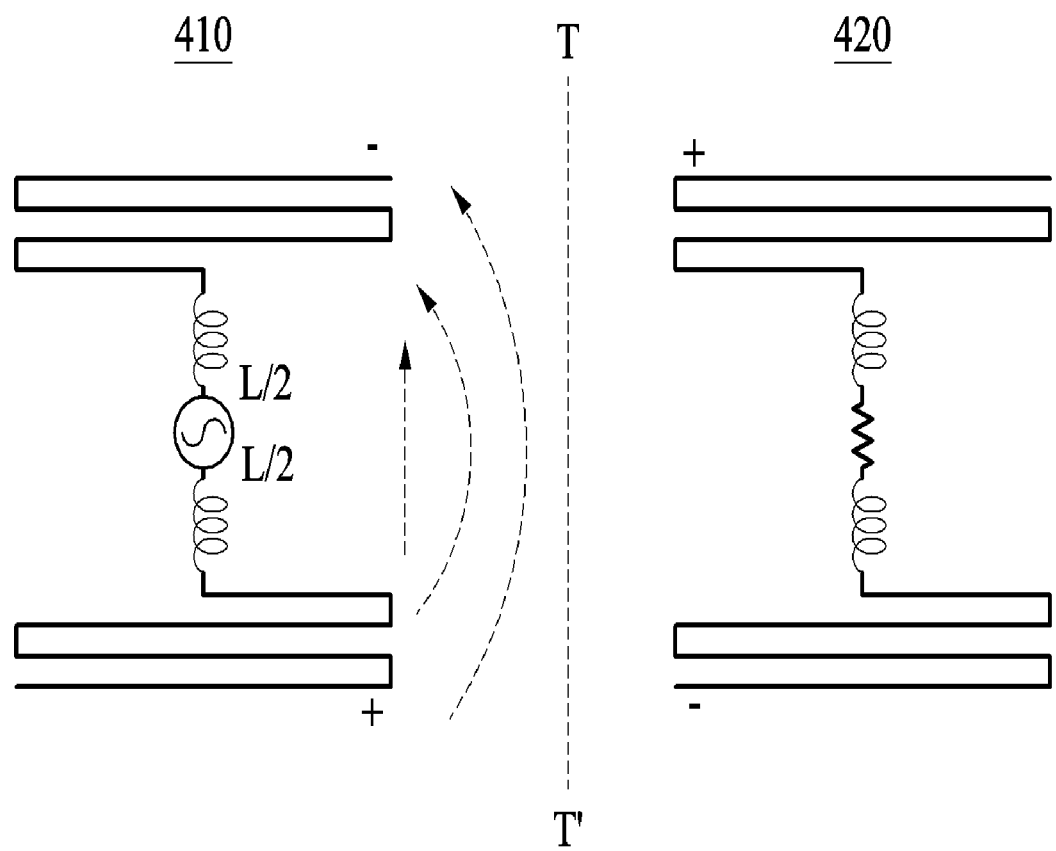
FIG. 4 illustrates examples of transmitting power using an electric field according to an example embodiment.

FIG. 4 illustrates examples of transmitting power using an electric field according to an example embodiment.

FIG. 4 illustrates a wireless power transmission device 410 and a wireless power receiving device 420. The power may be transmitted and received between the wireless power transmission device 410 and the wireless power receiving device 420 using the electric field. In detail, the wireless power transmission device 410 and the wireless power receiving device 420 may transmit and receive the power through coupling of the electric field.

The wireless power transmission device 410 is in a dipolar structure that generates the electric field. For example, the wireless power transmission device 410 may be in a meander-type dipolar structure. The wireless power receiving device 420 is in a structure that includes a load instead of including a voltage source in the wireless power transmission device 410. Each of the wireless power transmission device 410 and the wireless power receiving device 420 includes an inductor.

A resonant frequency of the wireless power receiving device 420 may be the same as a resonant frequency of the wireless power transmission device 410. The wireless power receiving device 420 resonates with the wireless power transmission device 410 and receives the power. In detail, the wireless power receiving device 420 may receive the power from the wireless power transmission device 410 through the load.

Each of the inductance of the wireless power transmission device 410 and the inductance of the wireless power receiving device 420 is L/2+L/2, that is, L. Each of the wireless power transmission device 410 and the wireless power receiving device 420 includes self-capacitance C. Each of the wireless power transmission device 410 and the wireless power receiving device 420 includes mutual-capacitance $C_m$ that occurs between conductive lines provided at both ends.

Figure 5:
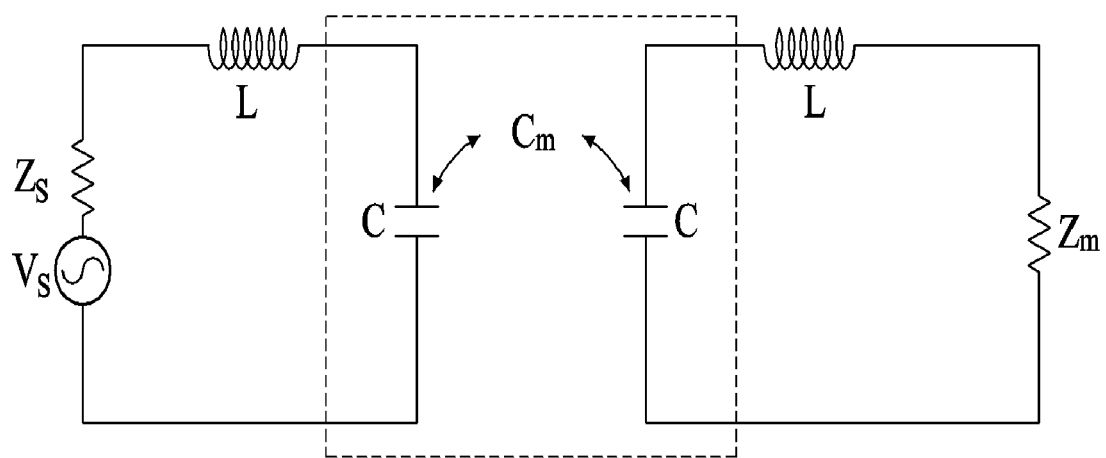
FIG. 5 illustrates examples of equivalent circuits of FIG. 4 according to an example embodiment.
Figure 5:
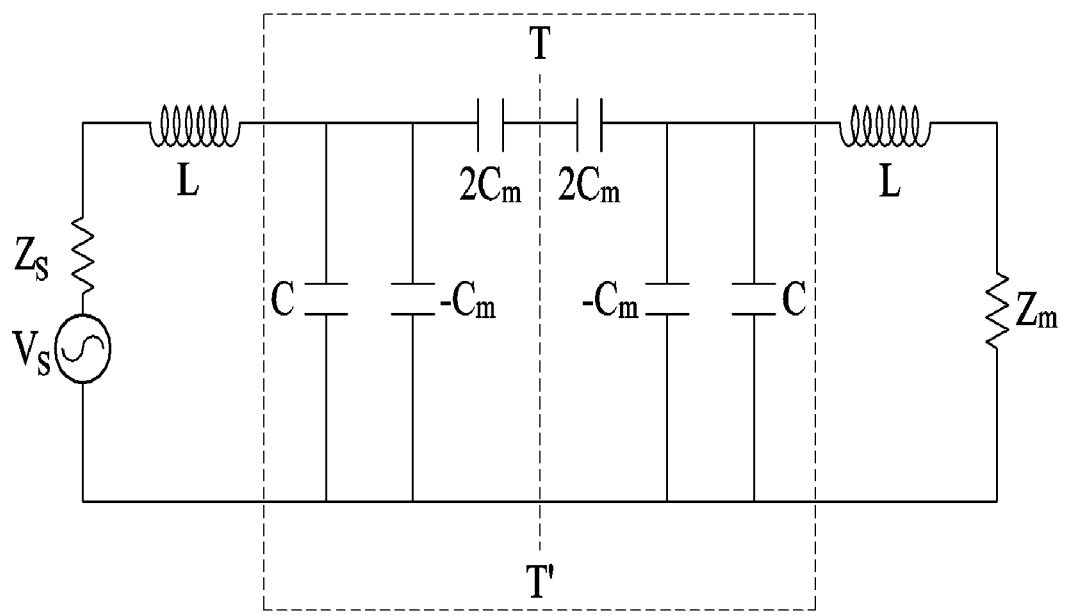

Equivalent circuits in which it is assumed that resistance of the conductive line is zero and an inductance component of the conductive line is zero in the wireless power transmission device 410 and the wireless power receiving device 420 are provided in FIG. 5.

FIG. 5 illustrates examples of equivalent circuits of FIG. 4 according to an example embodiment.

FIG. 5 illustrates a first equivalent circuit 510 and a second equivalent circuit 520.

In the first equivalent circuit 510, it is assumed that voltage of the voltage source of the wireless power transmission device 410 is $V_s$, impedance of the voltage source is $Z_s$, and impedance of the load of the wireless power receiving device 420 is $Z_m$. Each of the wireless power transmission device 410 and the wireless power receiving device 420 includes self-inductance L. The second equivalent circuit 520 is converted based on mutual-capacitance $C_m$ of the first equivalent circuit 510.

When the wireless power transmission device 410 and the wireless power receiving device 420 are symmetric to each other, an electric field distribution of the second equivalent circuit 520 may be symmetric based on an interface T-T' since both circuits have the same absolute value of current based on the interface T-T'. Once the electric field distribution becomes symmetric, the second equivalent circuit 520 may be open or shorted on the interface T-T'.

Two resonances may occur based on whether the interface T-T' is open or shorted. Resonant frequencies according to the two resonances may be represented as Equation 3 and Equation 4, respectively.

$$f_{r1} = \frac{1}{2\pi\sqrt{(C+C_m)L}}$$ [Equation 3]

$$f_{r2} = \frac{1}{2\pi\sqrt{(C-C_m)L}}$$ [Equation 4]

In Equation 3 and Equation 4, $f_{r1}$ denotes a first resonant frequency and $f_{r2}$ denotes a second resonant frequency.

The first resonant frequency has a characteristic of shorting the interface T-T', and the second resonant frequency has a characteristic of opening the interface T-T'. That is, the interface T-T' may be shorted at the first resonant frequency and the interface T-T' may be open at the second resonant frequency.

According to Equation 3, the first resonant frequency is inversely proportional to a sum of the self-capacitance C and the mutual-capacitance $C_m$. According to Equation 4, the second resonant frequency is inversely proportional to a difference between the self-capacitance C and the mutual-capacitance $C_m$.

An electric coupling amount is determined based on a difference between the resonant frequency and the second resonant frequency, which is similar to the magnetic coupling amount. According to an increase in the difference between the first resonant frequency and the second resonant frequency, the electric coupling amount increases. The electric coupling amount may be represented as $(f_{r2}^2-f_{r1}^2)/(f_{r1}^2+f_{r2}^2)$. Since the first resonant frequency and the second resonant frequency are affected by a relationship between the self-capacitance and the mutual capacitance, the electric coupling amount is also affected by the self-capacitance and the mutual capacitance. In detail, the electric coupling amount is determined based on a ratio of the mutual-capacitance to the self-capacitance ($C_m/C$).

As the electric coupling amount increases, the wireless power transmission device 410 may efficiently perform wireless power transmission. In detail, if the electric coupling amount is great and a transmission distance is constant, the power transmission efficiency may be high. Also, if the electric coupling amount is great, a power transmission distance having the power transmission efficiency greater than or equal to a desired value may increase. Accordingly, in the case of transmitting the power using the electric field, the performance of the wireless power transmission device 410 is affected by the electrical coupling amount.

Figure 6:
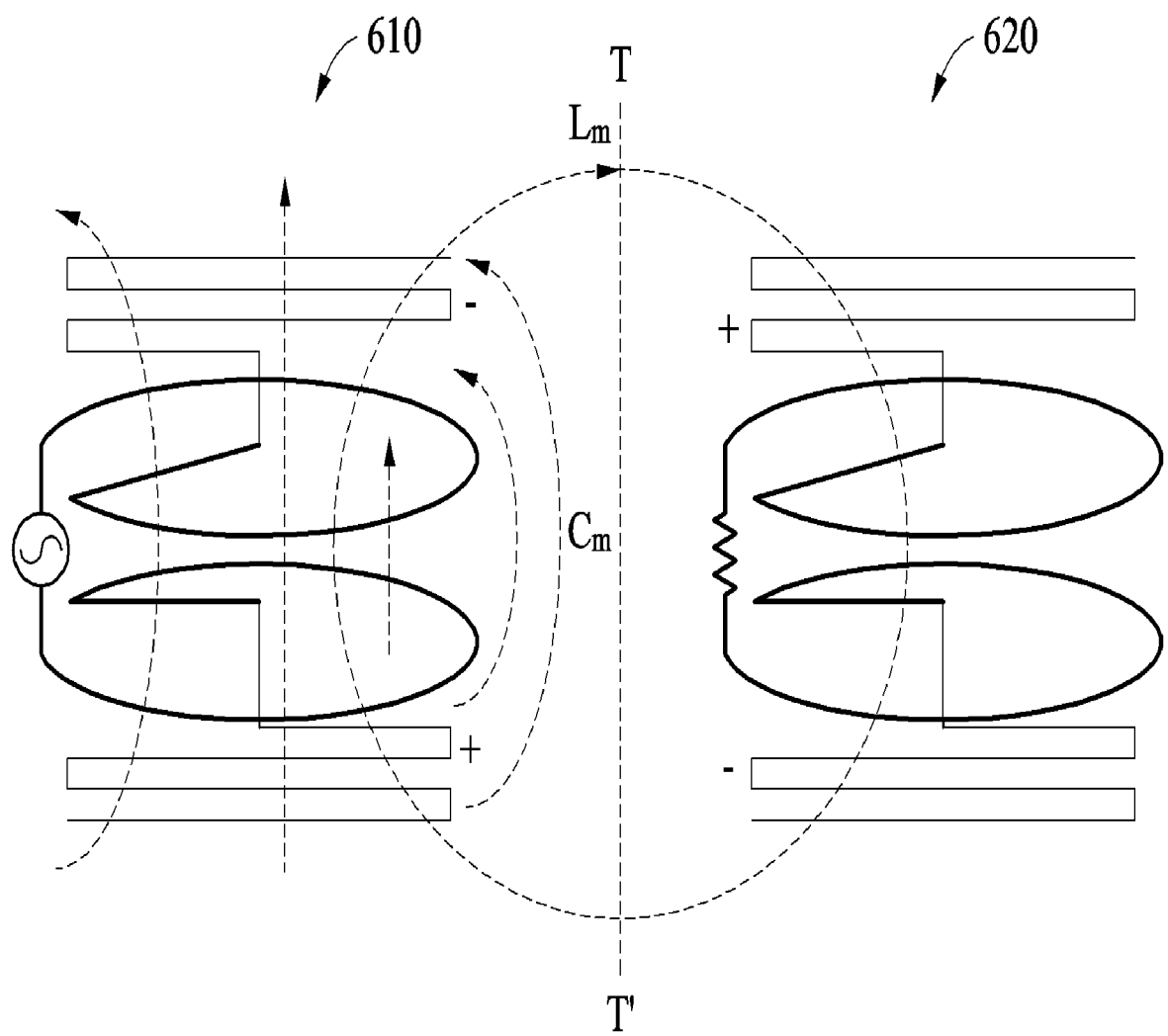
FIG. 6 illustrates examples of transmitting power using a magnetic field and an electric field according to an example embodiment.

FIG. 6 illustrates examples of transmitting power using a magnetic field and an electric field according to an example embodiment.

FIG. 6 illustrates a wireless power transmission device 610 and a wireless power receiving device 620. The power may be transmitted and received between the wireless power transmission device 610 and the wireless power receiving device 620 using the magnetic field and the electric field.

Each of the wireless power transmission device 610 and the wireless power receiving device 620 includes the loop structure of FIG. 2 and the dipolar structure of FIG. 4. A conductive line of the loop structure provided at the center of each of the wireless power transmission device 610 and the wireless power receiving device 620 may couple the magnetic field. The dipolar structure provided at both ends of each of the wireless power transmission device 610 and the wireless power receiving device 620 may couple the electric field.

The loop structure of each of the wireless power transmission device 610 and the wireless power receiving device 620 generates mutual inductance $L_m$. The dipolar structure of each of the wireless power transmission device 610) and the wireless power receiving device 620 generates mutual-capacitance $C_m$.

A resonant frequency of the wireless power receiving device 620 may be the same as a resonant frequency of the wireless power transmission device 610. The wireless power receiving device 620 resonates with the wireless power transmission device 610 and receives the power. In detail, the wireless power receiving device 620 may receive the power from the wireless power transmission device 610 through a load.

Figure 7:
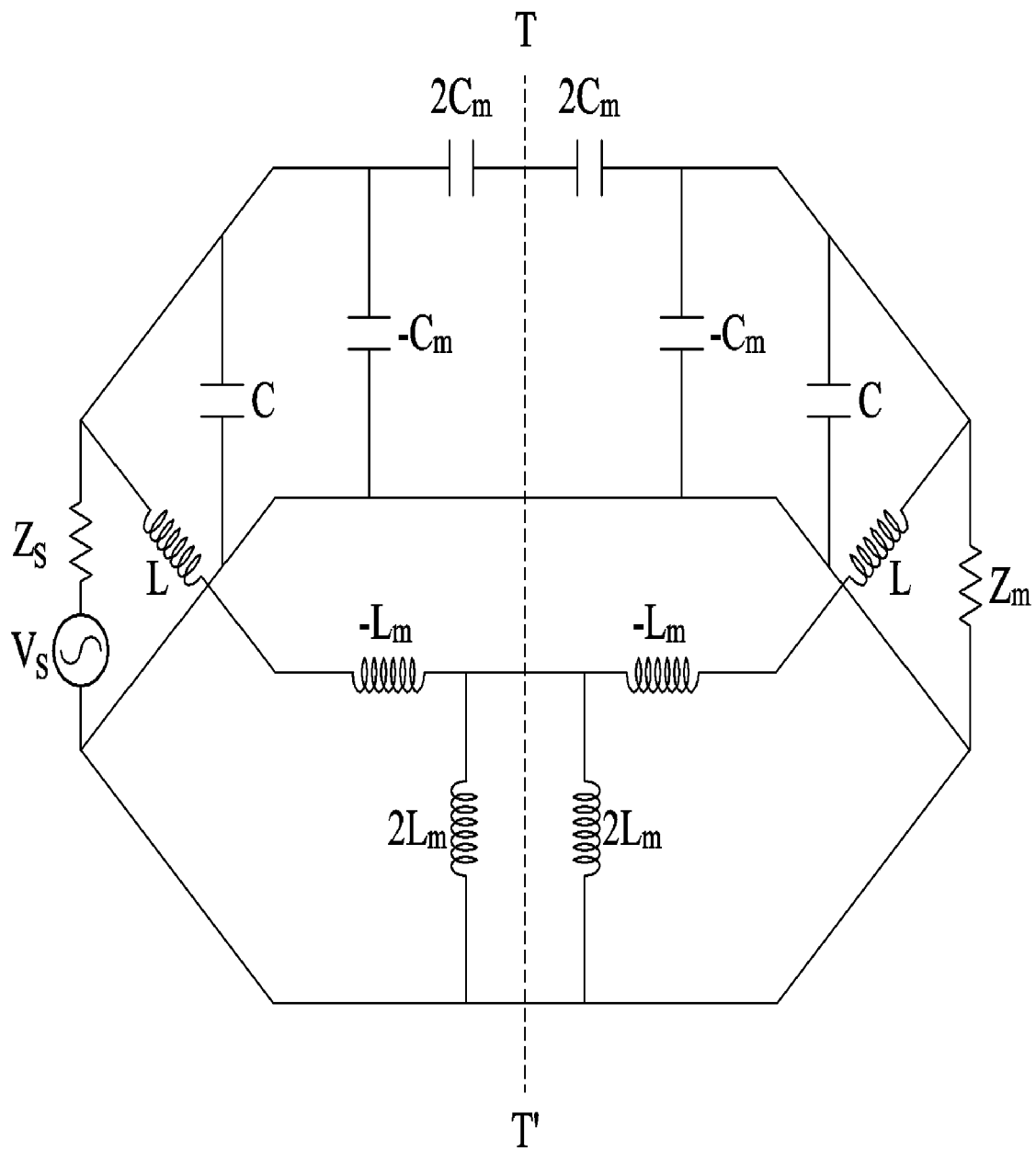
FIG. 7 illustrates an example of equivalent circuits of FIG. 6 according to an example embodiment.

An equivalent circuit of the wireless power transmission device 610 and the wireless power receiving device 620 are provided in FIG. 7.

FIG. 7 illustrates an example of an equivalent circuit of FIG. 6 according to an example embodiment.

In the equivalent circuit, it is assumed that voltage of the voltage source of the wireless power transmission device 610 is $V_s$, impedance of the voltage source is $Z_s$, and impedance of the load of the wireless power receiving device 620 is $Z_m$. Each of the wireless power transmission device 610 and the wireless power receiving device 620 includes self-inductance L and self-capacitance C.

When the wireless power transmission device 610 and the wireless power receiving device 620 are symmetric as shown in FIG. 6, an electric field distribution and a magnetic field distribution may be symmetric based on an interface T-T'. Since the electric field and the magnetic field are present in an energy form, a phase difference between the electric field and the magnetic field may be 90 degrees.

Four resonances may occur based on whether an upper end of the interface T-T' is open or shorted or whether a lower end of the interface T-T' is open or shorted. Here, the upper end of the interface T-T' represents an interface between 2 $C_m$, and the lower end of the interface T-T' represents an interface between 2 $L_m$. The four resonances may be classified into a negative coupled resonance and a positive coupled resonance. The negative coupled resonance indicates a case in which all of the upper end and the lower end of the interface T-T' are open and a case in which all of the upper end and the lower end of the interface T-T' are shorted. The positive coupled resonance indicates a case in which the upper end of the interface T-T' is open and the lower end of the interface T-T' is shorted and a case in which the upper end of the interface T-T' is shorted and the upper end of the interface T-T' is open.

Resonant frequencies according to the negative coupled resonance may be represented as Equation 5 and Equation 6, respectively.

$$f_{r1} = \frac{1}{2\pi\sqrt{(L+L_m)(C-C_m)}} \quad \text{[Equation 5]}$$

$$f_{r2} = \frac{1}{2\pi\sqrt{(L-L_m)(C+C_m)}} \quad \text{[Equation 6]}$$

In Equation 5 and Equation 6, $f_{r1}$ denotes a first resonant frequency and $f_{r2}$ denotes a second resonant frequency. The first resonant frequency has a characteristic of opening all of the upper end and the lower end interface T-T'. The second resonant frequency has a characteristic of shorting all of the upper end and the lower end of the interface T-T'.

Resonant frequencies according to the positive coupled resonance may be represented as Equation 7 and Equation 8, respectively.

$$f_{r1} = \frac{1}{2\pi\sqrt{(L+L_m)(C+C_m)}} \quad \text{[Equation 7]}$$

$$f_{r2} = \frac{1}{2\pi\sqrt{(L-L_m)(C-C_m)}} \quad \text{[Equation 8]}$$

Equation 7 and Equation 8, $f_{r1}$ denotes a first resonant frequency and $f_{r2}$ denotes a second resonant frequency. The first resonant frequency has a characteristic of shorting the upper end of the interface T-T' and opening the lower end of the interface T-T'. The second resonant frequency has a characteristic of opening the upper end of the interface T-T' and shorting the lower end of the interface T-T'.

A coupling amount according to the negative coupled resonance and a coupling amount according to the positive coupled resonance may differ. A coupling amount by a magnetic field coupling may be $K_H = L_m/L$ and a coupling amount by an electric field coupling may be $K_E = C_m/C$. In this example, the coupling amount of the negative coupled resonance and the coupling amount of the positive coupled resonance may be induced to be Equation 9 and Equation 10, respectively.

$$k_T = \frac{k_H - k_E}{1 - k_H k_E} \quad \text{[Equation 9]}$$

$$k_T = \frac{k_H + k_E}{1 + k_H k_E} \quad \text{[Equation 10]}$$

Equation 9 shows a coupling amount $K_T$ according to the negative coupled resonance. Equation 10 shows a coupling amount $K_T$ according to the positive coupled resonance. The coupling amount according to the positive coupled resonance is greater than the coupling amount according to the negative coupled resonance.

Accordingly, in the case of using the positive coupled resonance, it is possible to enhance a power transmission efficiency in a wireless power transmission. Also, in the case of using the positive coupled resonance, it is possible to increase a transmission distance in the wireless power transmission.

In detail, in the case of using the positive coupled resonance, when a power transmission distance is predetermined distance, the wireless power transmission device 610 may enhance the power transmission efficiency. When the power transmission efficiency is constant, the wireless power transmission device 610 may increase the power transmission distance.

A relationship based on characteristics of Equation 9 and Equation 10 may be represented as Equation 11.

$$\left| \frac{K_H + K_E}{1 + K_H K_E} \right| \geq |K_H \text{ or } K_E| \geq \left| \frac{K_H - K_E}{1 - K_H K_E} \right| \quad \text{[Equation 11]}$$

Referring to Equation 11, the coupling amount according to the positive coupled resonance is greater than or equal to the coupling amount according to the electric field coupling or the coupling amount according to the magnetic field. The coupling amount according to the negative coupled resonance is less than or equal to the coupling amount according to the electric field coupling or the coupling amount according to the magnetic field coupling. For example, if $K_H$ and $K_E$ are similar, the coupling amount according to the positive coupled resonance may become about two folds of $K_H$ or $K_E$.

Conversely, compared to a case of using the magnetic field coupling or the electric field coupling, the coupling amount according to the negative coupled resonance may significantly decrease. That is, the negative coupled resonance may significantly degrade the power transmission performance of the wireless power transmission device 610.

Figure 8:
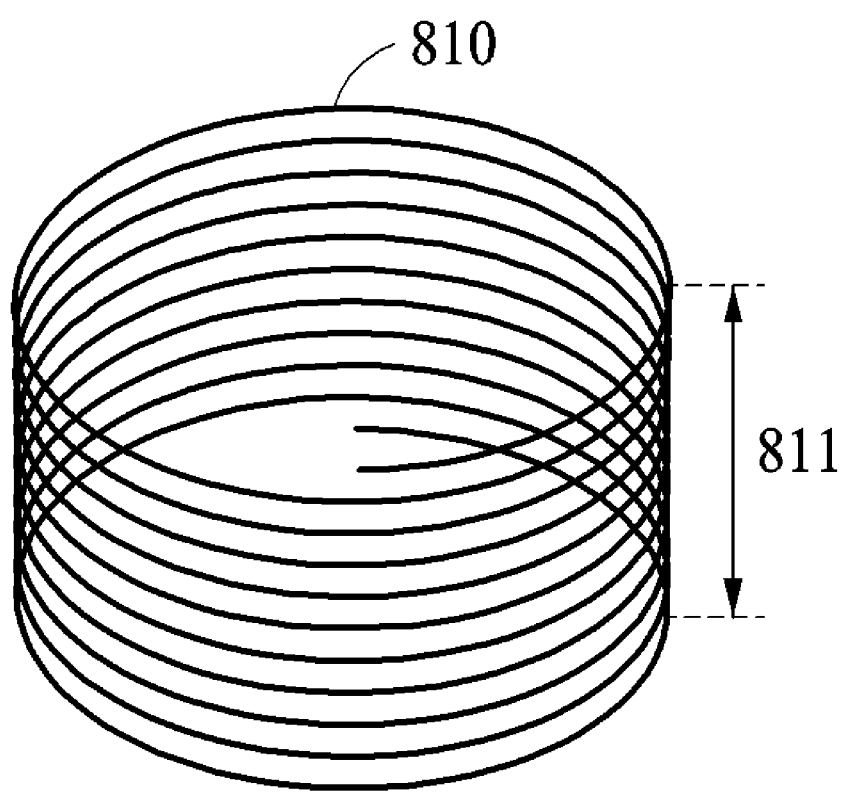
FIG. 8 illustrates an example of a wireless power transmission device for transmitting power using a magnetic field and an electric field according to an example embodiment.

FIG. 8 illustrates an example of a wireless power transmission device for transmitting power using a magnetic field and an electric field according to an example embodiment.

FIG. 8 illustrates a wireless power transmission device 810 and a reference segment 811. The wireless power transmission device 810 includes a cylindrical coil and a voltage source. The reference segment 811 refers to a segment that denotes a length of the cylindrical coil.

The cylindrical coil refers to a coil that is manufactured by increasing a length of a cylinder and by increasing a number of turns that the coil winds up compared to a coil that generally uses a magnetic field coupling. Also, the cylindrical coil may be manufactured by adjusting an interval between conductive lines.

In this case, electric field energy and magnetic field energy present around the cylindrical coil may be low, and electric field energy and magnetic field energy present at the center of the cylindrical coil may be low. An amount of space radiation of the wireless power transmission device 810 may increase. Accordingly, a structure of the coil may be modified in addition to the number of turns of the coil and the length of the cylinder.

Figure 9:
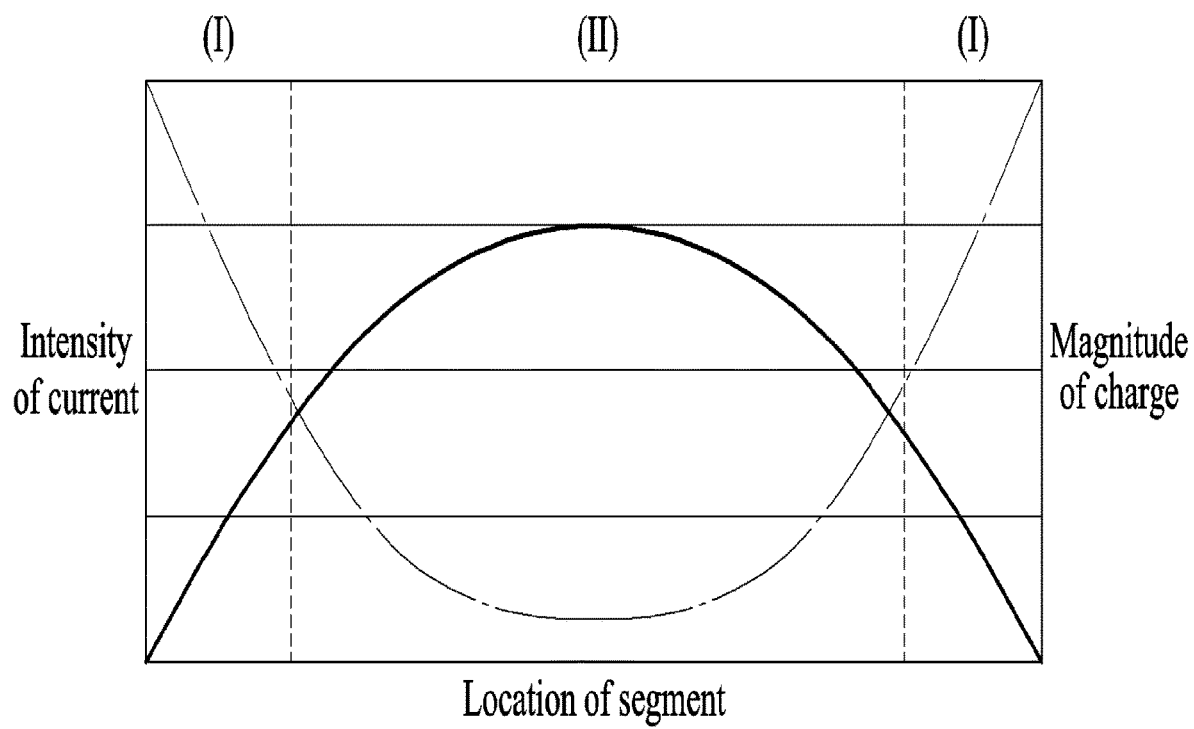
FIG. 9 is a graph showing an intensity of current and a magnitude of charge of a coil of FIG. 8 according to an example embodiment.

FIG. 9 is a graph showing an intensity of current and a magnitude of charge of the coil of FIG. 8 according to an example embodiment.

In the graph of FIG. 9, a solid line denotes an intensity of current based on the reference segment 811 and a dotted line denotes a magnitude of charge based on the reference segment 811.

Referring to FIG. 9, the intensity of current has a relatively large value at the center of the reference segment 811 and decreases with getting closer toward both ends of the reference segment 811. The magnitude of charge has a relatively small value at the center of the reference segment 811 and increases with getting closer toward both ends of the reference segment 811.

The coil may be configured based on characteristics of the intensity of current and the magnitude of charge. In detail, the coil may be configured to generate a relatively strong magnetic field coupling in a center portion of the reference segment 811. The coil may be configured to generate a relatively strong electric field coupling at both ends of the reference segment 811.

That is, the coil may be divided into an electric field coupling use area I and a magnetic field coupling use area II based on the reference segment 811. By manufacturing the coil based on the divided areas, it is possible to increase the electric field energy and the magnetic field energy of the coil.

Figure 10:
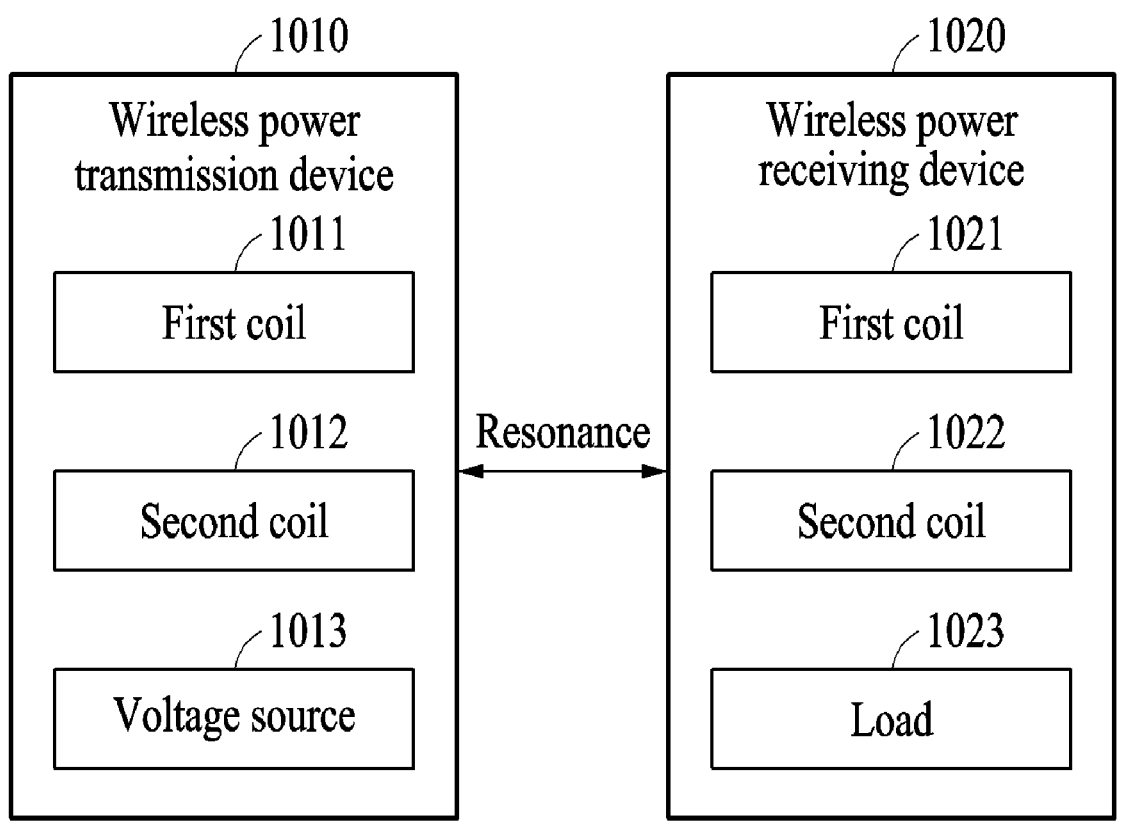
FIG. 10 is a diagram illustrating an example of a wireless power transmission device and a wireless power receiving device according to an example embodiment.

FIG. 10 is a diagram illustrating an example of a wireless power transmission device and a wireless power receiving device according to an example embodiment.

FIG. 10 illustrates an example of a wireless power transmission device 1010 and a wireless power receiving device 1020.

The wireless power transmission device 1010 includes a first coil 1011, a second coil 1012, and a voltage source 1013. The wireless power receiving device 1020 includes a first coil 1021, a second coil 1022, and a load 1023.

Here, the first coil 1011 and the first coil 1021 may be in the same structure. The second coil 1012 and the second coil 1022 may be in the same structure. That is, the wireless power transmission device 1010 and the wireless power receiving device 1020 may be in the same structure aside from the voltage source 1013 and the load 1023.

The first coil 1011, 1021 is a coil provided in a first direction. In detail, the first coil 1011, 1021 may include a conductive line that is wound a plurality of turns in the first direction. For example, the first coil 1011, 1021 may include a conductive line that is wound in a circular shape or a rectangular shape. The first coil 1011, 1021 may be provided on the magnetic field coupling use area II. Here, the first direction may be the same as a direction of the reference segment 811.

The second coil 1012, 1022 is provided in a second direction that is perpendicular to the first direction and may be connected to both ends of the first coil 1011, 1021. In detail, the second coil 1012, 1022 may include a conductive line that is wound a plurality of turns toward a center of the first coil in the second direction. For example, the second coil 1012, 1022 may include a conductive line that is wound in a circular shape or a rectangular shape. The second coil 1012, 1022 may be provided on the electric field coupling use area I.

The voltage source 1013 supplies voltage to the first coil 1011 and the second coil 1012. In response to the voltage being supplied from the voltage source 1013 to the first coil 1011 and the second coil 1012, the first coil 1011 and the second coil 1012 may generate an electric field and a magnetic field. The wireless power transmission device 1010 may transmit the power to the wireless power receiving device 1020 using the electric field and the magnetic field. In detail, the wireless power transmission device 1010 may transmit the power to the wireless power receiving device 1020 through a resonance using the electric field and the magnetic field.

The wireless power receiving device 1020 may receive the power from the wireless power transmission device 1010. In detail, the first coil 1021 and the second coil 1022 may receive the power from the wireless power transmission device 1010. The load 1023 may be supplied with the voltage from the first coil 1021 and the second coil 1022. Here, the load 1023, as a load in which current flows once voltage is applied, may be a device, for example, a battery, capable of storing the power.

In the following, a description related to the first coil 1011 may be the same as a description related to the first coil 1021. A description related to the second coil 1012 may be the same as a description related to the second coil 1022. Except that the load 1023 is provided to the wireless power receiving device 1020 instead of providing the voltage source 1013, a description related to the wireless power transmission device 1010 may be the same as a description related to the wireless power receiving device 1020 in the following figures.

Figure 11:
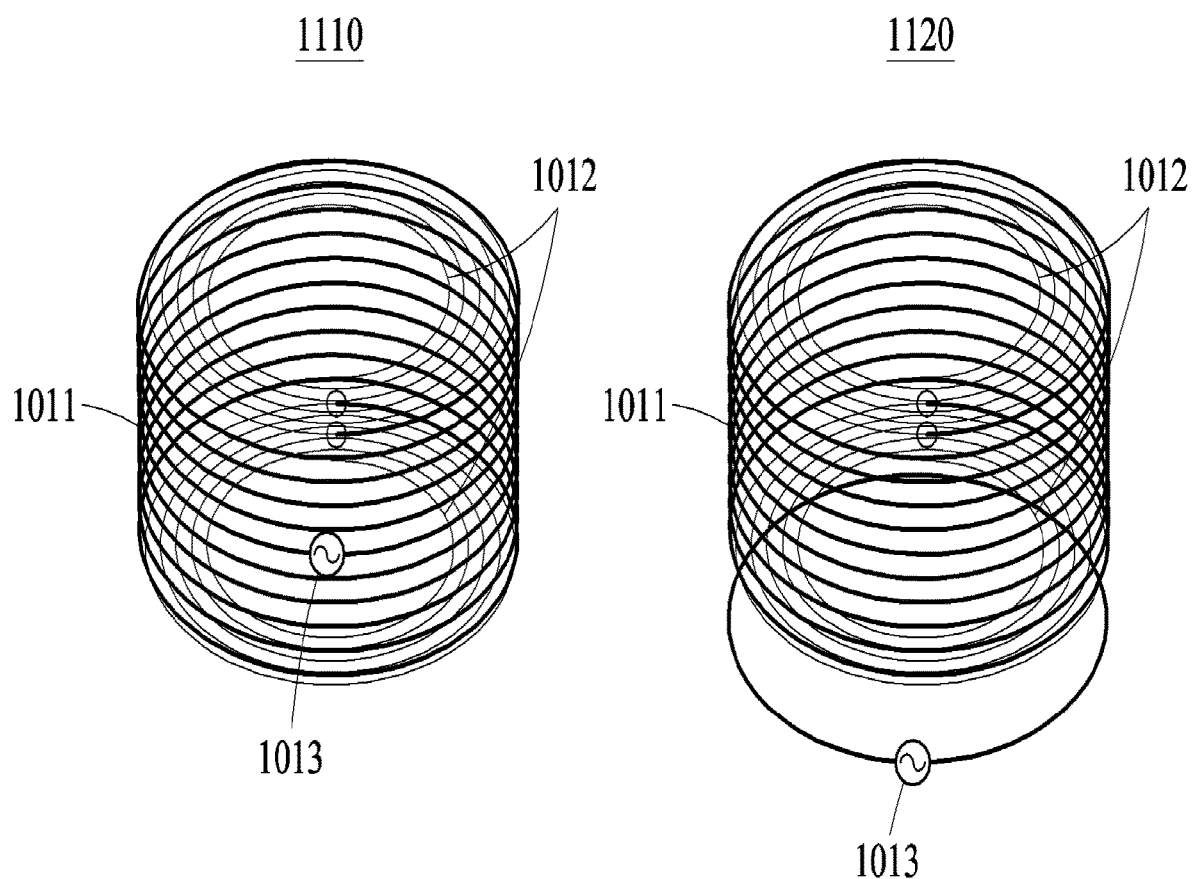
FIG. 11 illustrates examples of a wireless power transmission device in which a coil is wound in a circular shape according to an example embodiment.

FIG. 11 illustrates examples of a wireless power transmission device in which a coil is wound in a circular shape according to an example embodiment.

FIG. 11 illustrates a direct power supply scheme 1110 and an indirect power supply scheme 1120 for the wireless power transmission device 1010.

Referring to the direct power supply scheme 1110, the wireless power transmission device 1010 includes the first coil 1011, the second coil 1012, and the voltage source 1013. The first coil 1011 includes a conductive line that is wound a plurality of turns in a circular shape in a first direction. An interval between the conductive lines of the first coil 1011 may be set to be constant.

The second coil 1012 includes a conductive line that is wound a plurality of turns in a circular shape in a second direction perpendicular to the first direction. The second coil 1012 may be connected to both ends of the first coil 1011.

The second coil 1012 may include a conductive line that is wound a plurality of turns toward the center of the first coil 1011. The circular shape of the conductive line of the second coil 1012 may have a decreasing size as the conductive line further winds up. The voltage source 1013 may be connected to the first coil 1011 and may supply voltage.

Referring to the indirect power supply scheme 1120, the wireless power transmission device 1010 includes a voltage supply loop provided on a plane parallel to the second coil 1012. The voltage source 1013 may be connected to the voltage supply loop. In response to the voltage being supplied from the voltage source 1013, the voltage supply loop may generate a magnetic field and may indirectly supply the voltage to the first coil 1011 and the second coil 1012.

Each of the first coil 1011 and the second coil 1012 may be in an oval shape. Also, a conductive line of each layer of the first coil 1011 and the second coil 1012 may have a different circumference. FIG. 11 is provided as an example only of winding the first coil 1011 and the second coil 1012. Accordingly, coils may be wound in various shapes without departing from the scope of the disclosure.

The description made above in relation to the direct power supply scheme 1110 and the indirect power supply scheme 1120 may be applied alike to the wireless power receiving device 1020. Instead of providing the voltage source 1013, the load 1023 may be provided to the wireless power receiving device 1020.

Figure 12:
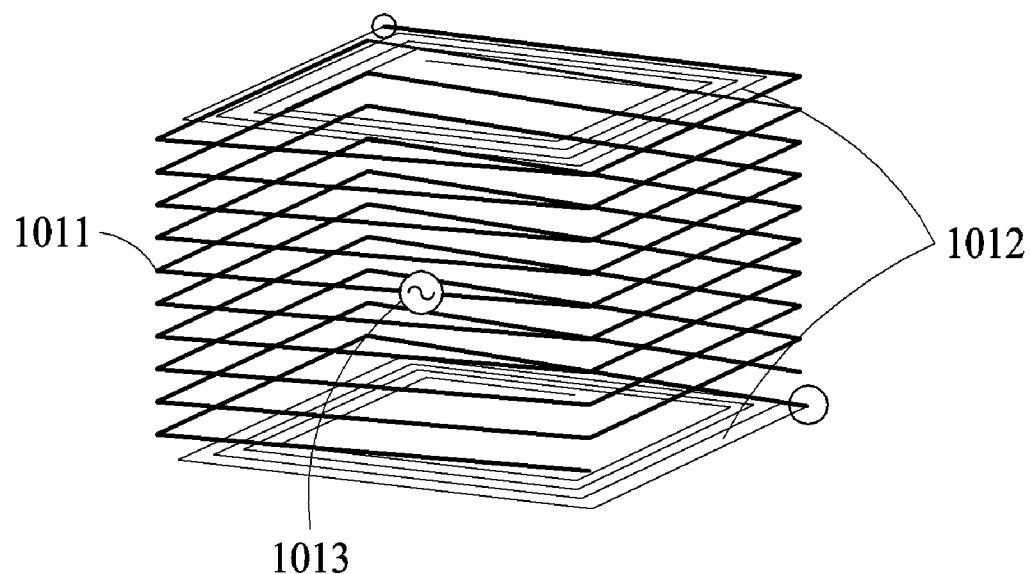
FIG. 12 illustrates examples of a wireless power transmission device in which a coil is wound in a rectangular shape according to an example embodiment.
Figure 12:
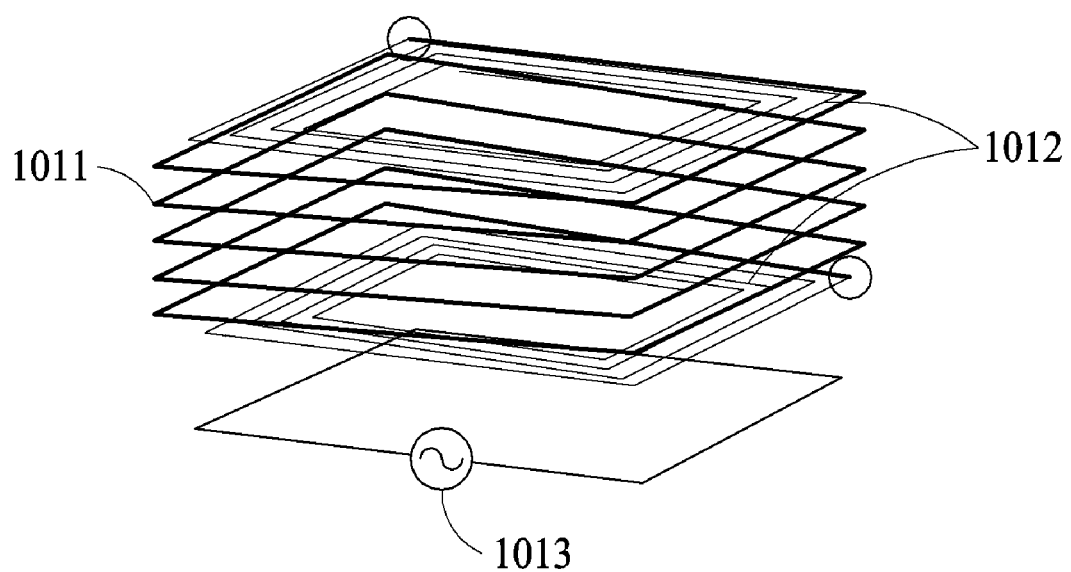

FIG. 12 illustrates examples of a wireless power transmission device in which a coil is wound in a rectangular shape according to an example embodiment.

FIG. 12 illustrates a direct power supply scheme 1210 and an indirect power supply scheme 1220 for the wireless power transmission device 1010. Coils of FIG. 12 may be configured to be in a rectangular parallelepiped shape, which differs from those of FIG. 11.

Referring to the direct power supply scheme 1210, the wireless power transmission device 1010 includes the first coil 1011, the second coil 1012, and the voltage source 1013. The first coil 1011 includes a conductive line that is wound a plurality of turns in a rectangular shape in a first direction. An interval between conductive lines of the first coil 1011 may be set to be constant.

The second coil 1012 includes a conductive line that is wound a plurality of turns in a rectangular shape in a second direction perpendicular to the first direction. The second coil 1012 may be connected to both ends of the first coil 1011. The second coil 1012 may include a conductive line that is wound a plurality of turns toward the center of the first coil 1011. The rectangular shape of the conductive line of the second coil 1012 may have a decreasing size as the conductive line further winds up. The voltage source 1013 may be connected to the first coil 1011 and may supply voltage.

Referring to the indirect power supply scheme 1220, the wireless power transmission device 1010 includes a voltage supply loop provided on a plane parallel to the second coil 1012. The voltage source 1013 may be connected to the voltage supply loop. In response to the voltage being supplied from the voltage source 1013, the voltage supply loop may generate a magnetic field and may indirectly supply the voltage to the first coil 1011 and the second coil 1012.

Each of the first coil 1011 and the second coil 1012 may be in a quadrature rectangular shape. Also, each of the first coil 1011 and the second coil 1012 may be provided in another polygonal shape aside from the rectangular shape. Also, a conductive line of each layer of the first coil 1011 and the second coil 1012 may be configured to have a different circumference. A shape in which the first coil 1011 and the second coil 1012 are wound is provided as an example only. The first coil 1011 and the second coil 1012 may be wound up in various shapes.

If an interior of the wireless power transmission device 1010 is in a rectangular shape, the first coil 1011, the second coil 1012, and the voltage source 1013 provided in the above shape may maximally use a mounting space.

The description made above in relation to the direct power supply scheme 1210 and the indirect power supply scheme 1220 may be applied alike to the wireless power receiving device 1020. Instead of providing the voltage source 1013, the load 1023 may be provided to the wireless power receiving device 1020.

Figure 13:
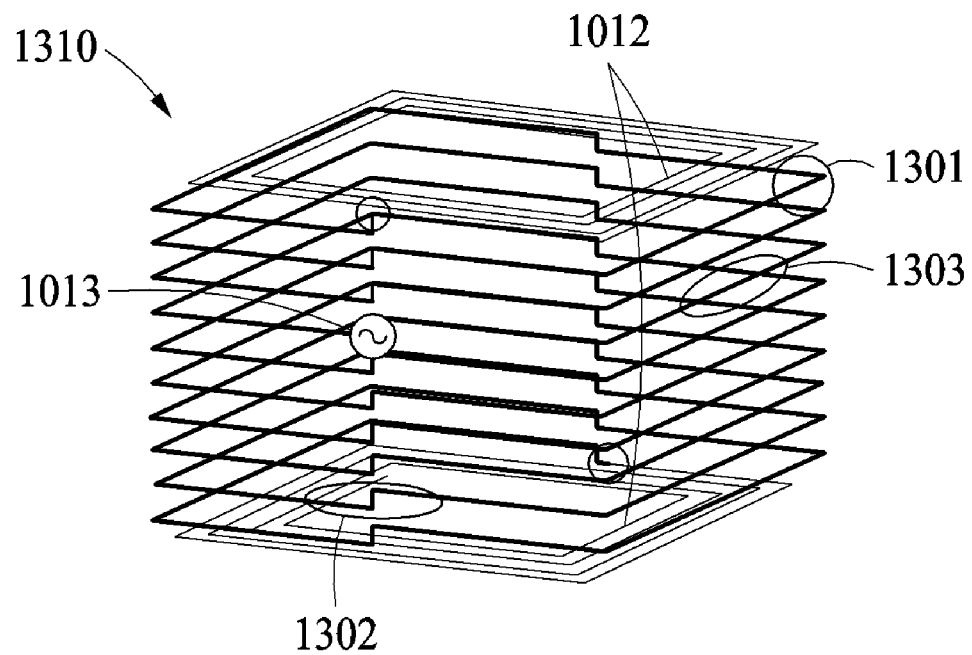
FIG. 13 illustrates an example of a wireless power transmission device in which a coil is wound in a rectangular shape and a connector according to an example embodiment.
Figure 13:
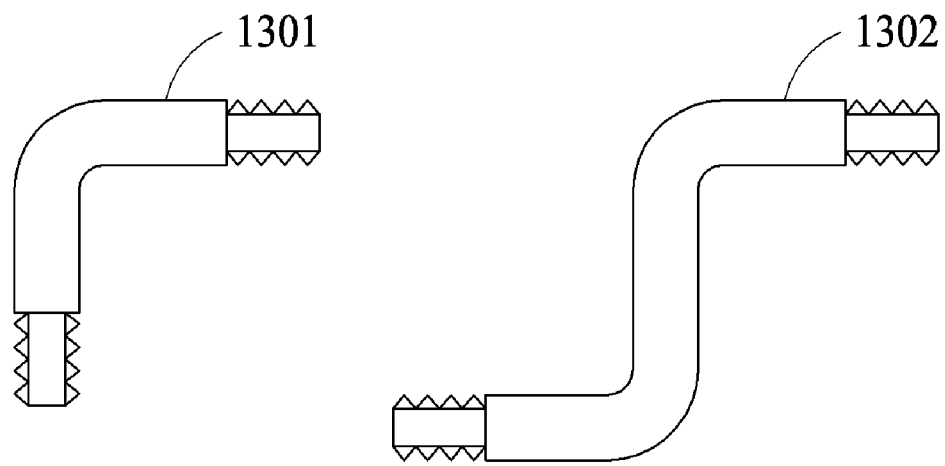
Figure 13:
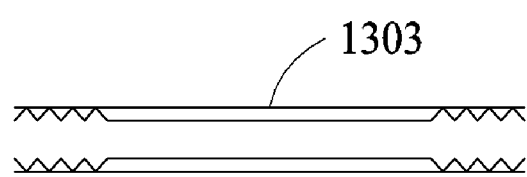

FIG. 13 illustrates an example of a wireless power transmission device in which a coil is wound in a rectangular shape and a connector according to an example embodiment.

FIG. 13 illustrates an implementation example 1310 in which the wireless power transmission device 1010 of FIG. 12 is assembled. Referring to FIG. 13, the wireless power transmission device 1010 includes the first coil 1011, the second coil 1012, and the voltage source 1013, and also includes a first connector 1301, a second connector 1302, and a third connector 1303.

The first connector 1301, the second connector 1302, and the third connector 1303 are parts that constitute the first coil 1011 and the second coil 1012. The first connector 1301, the second connector 1302, and the third connector 1303 may be a metal material, for example, copper, aluminum, and silver. Each of the first connector 1301, the second connector 1302, and the third connector 1303 may include a thread at each of both ends.

The first connector 1301 may be provided at each of corners of the first coil 1011 and the second coil 1012. The third connector 1303 may be provided at a portion at which a number of turns of the first coil 1011 increases or decreases. The second connector 1302 may be connected to the first connector 1301 or the third connector 1303. Also, the second connector 1302 may be connected to another second connector 1302.

Using the first connector 1301, the second connector 1302, and the third connector 1303, the wireless power transmission device 1010 and the wireless power receiving device 1020 may be assembled.

Figure 14:
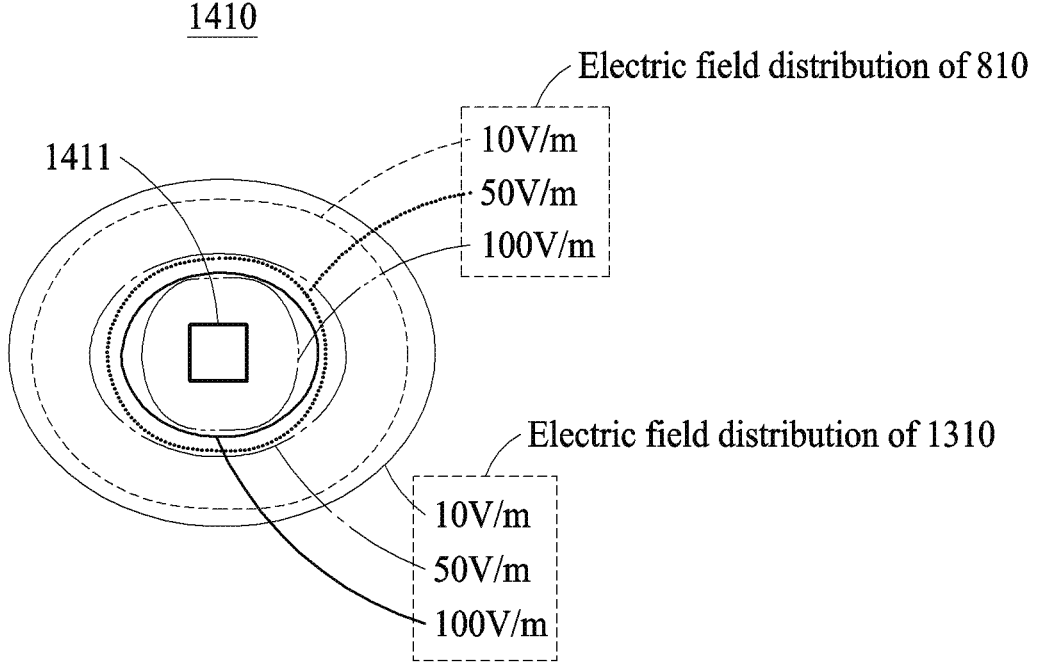
FIG. 14 illustrates an example of an electric field distribution of the wireless power transmission device of FIG. 8 and an electric field distribution of the wireless power transmission device of FIG. 13 and an example of a magnetic field distribution of the wireless power transmission device of FIG. 8 and a magnetic field distribution of the wireless power transmission device of FIG. 13 according to an example embodiment.
Figure 14:
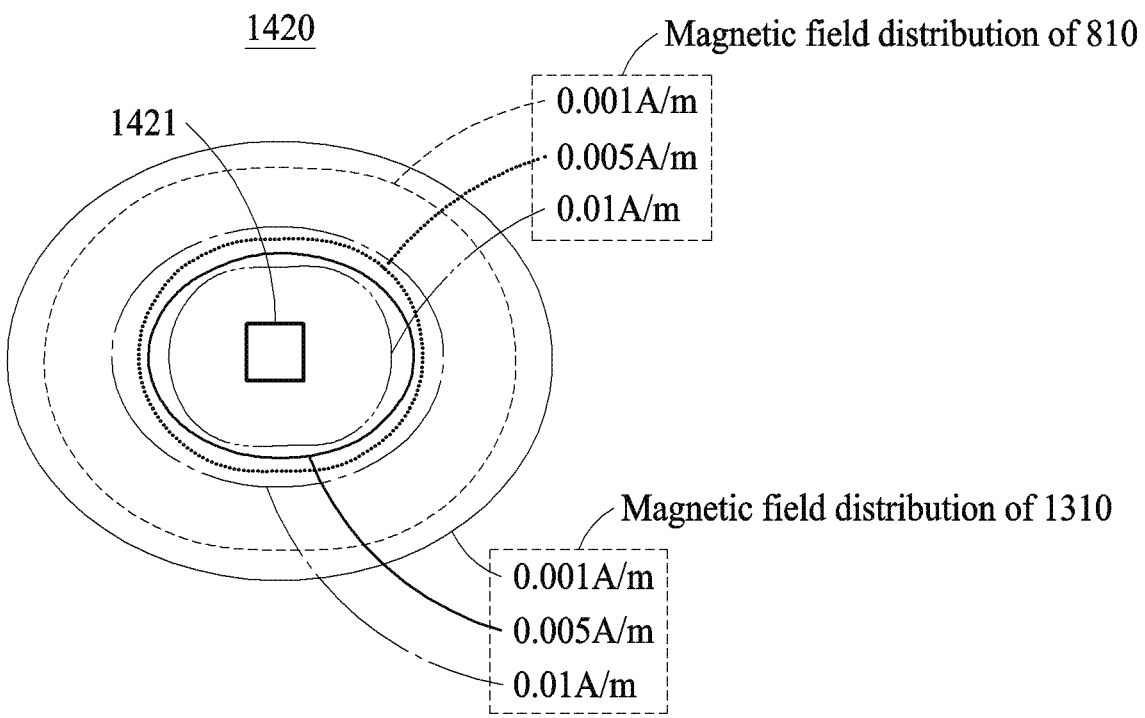

FIG. 14 illustrates an example of an electric field distribution of the wireless power transmission device of FIG. 8 and an electric field distribution of the wireless power transmission device of FIG. 13 and an example of a magnetic field distribution of the wireless power transmission device of FIG. 8 and a magnetic field distribution of the wireless power transmission device of FIG. 13 according to an example embodiment.

FIG. 14 illustrates a cross-sectional location 1411, a cross-sectional location 1421, an electric field distribution 1410, and a magnetic field distribution 1420. The electric field distribution 1410 and the magnetic field distribution 1420 represent the electric field distribution and the magnetic field distribution of the wireless power transmission device 810 and the implementation example 1310, respectively.

For comparison, the wireless power transmission device 810 and the wireless power transmission device 1010 of the implementation example 1310 have the same width of 60 cm and the same number of turns, for example, 14 turns. The wireless power transmission device 810 and the wireless power transmission device 1010 of the implementation example 1310 are located at the cross-sectional locations 1411 and 1421.

The wireless power transmission device 810 has the radiation efficiency of −13.2 dB at a single resonance. The wireless power transmission device 1010 of the implementation example 1310 has the radiation efficiency of −15.65 db. Accordingly, the wireless power transmission device 1010 of the implementation example 1310 has the radiation efficiency less than that of the wireless power transmission device 810. The wireless power transmission device 1010 of the implementation example 1310 may have the less interference-related effect on a neighboring environment due to a relatively small space radiation.

Referring to the electric field distribution 1410 and the magnetic field distribution 1420, the electric field and the magnetic field of the wireless power transmission device 1010 of the implementation example 1310 are greater than those of the wireless power transmission device 810. That is, the wireless power transmission device 1010 of the implementation example 1310 has a relatively small amount of space radiation and has a relatively great power transmission distance compared to the wireless power transmission device 810.

Figure 15:
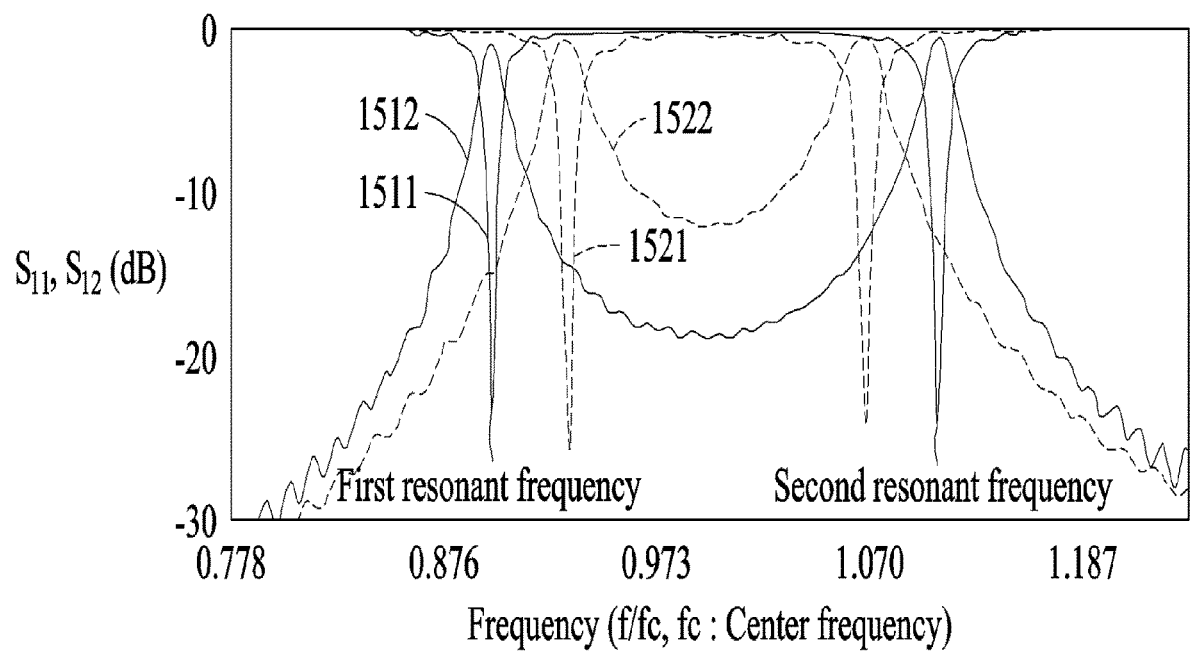
FIG. 15 is a graph showing a comparison of an S parameter characteristic between the wireless power transmission device of FIG. 8 and the wireless power transmission device of FIG. 13 according to an example embodiment.

FIG. 15 is a graph showing a comparison of an S parameter characteristic between the wireless power transmission device of FIG. 8 and the wireless power transmission device of FIG. 13 according to an example embodiment.

FIG. 15 illustrates an input reflection coefficient 1511 and a permeability coefficient 1512 of the wireless power transmission device 1010 of the implementation example 1310 and an input reflection coefficient 1521 and a permeability coefficient 1522 of the wireless power transmission device 810.

Here, a conductive line of the wireless power transmission device 810 is wound in a rectangular shape, which differs from that of FIG. 8. A coil of the wireless power transmission device 810 is wound 12 turns. The first coil 1011 of the wireless power transmission device 1010 of the implementation example 1310 is wound 12 turns and the second coil 1012 of the wireless power transmission device 1010 of the implementation example 1310 is wound 5 turns.

Referring to the graph of FIG. 15, a difference between a first resonant frequency and a second resonant frequency of the power transmission device 1010 of the implementation example 1310 can be known from the input reflection coefficient 1511 and the permeability coefficient 1512. A difference between a first resonant frequency and a second resonant frequency of the wireless power transmission device 810 can be known from the input reflection coefficient 1521 and the permeability coefficient 1522.

That is, a coupling amount of the wireless power transmission device 1010 of the implementation example 1310 is greater than a coupling amount of the wireless power transmission device 810.

Figure 16:
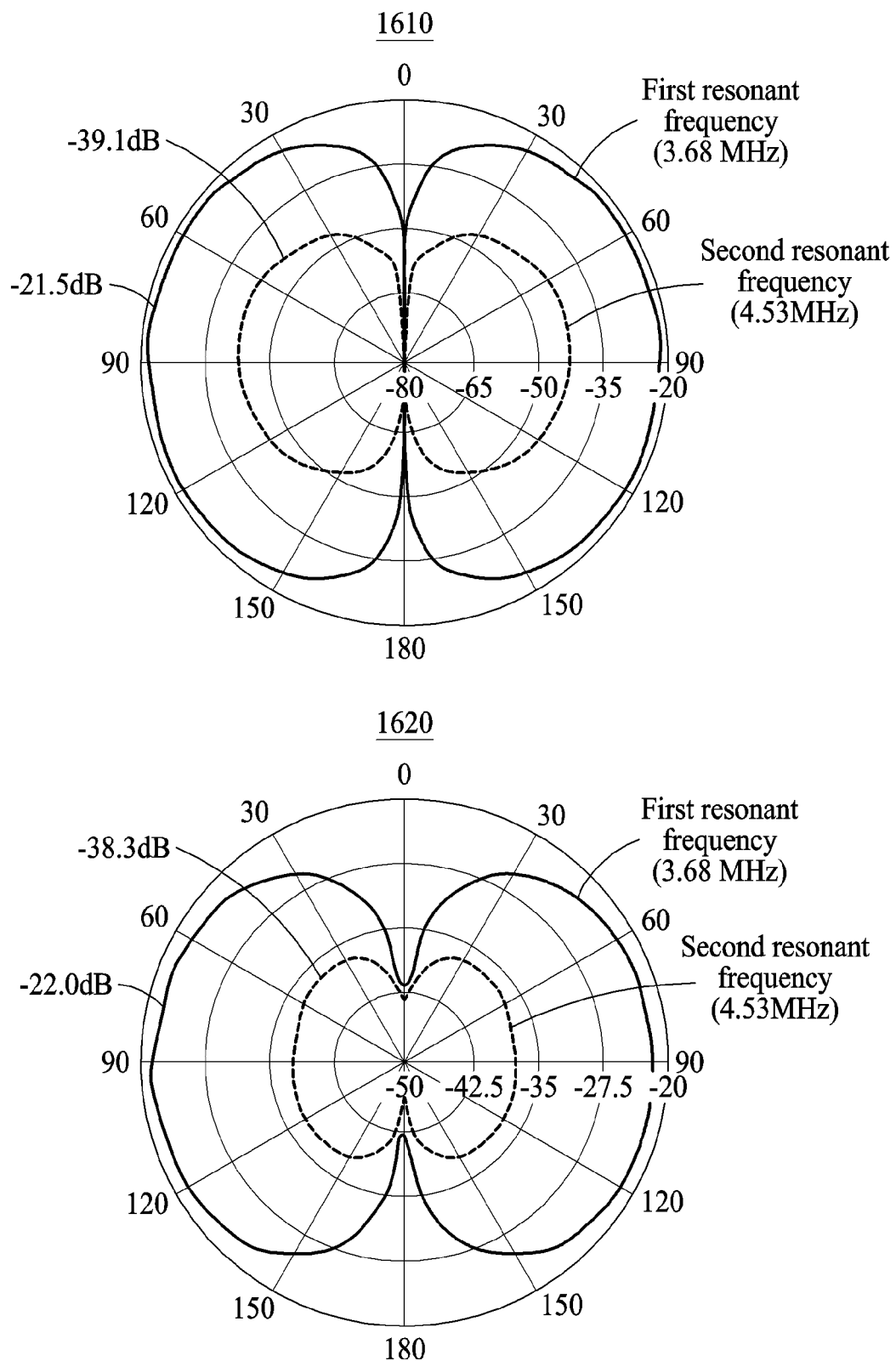
FIG. 16 illustrates examples of a realized gain of the wireless power transmission device of FIG. 8 according to an example embodiment.

FIG. 16 illustrates examples of a realized gain of the wireless power transmission device of FIG. 8 according to an example embodiment.

FIG. 16 illustrates a realized gain when a transmission distance of the wireless power transmission device 810 is equal to a width of a coil. In detail, FIG. 16 illustrates a θ component gain 1610 and a Φ component gain 1620.

Compared to a radiation amount of the wireless power transmission device 810 at a second resonant frequency, a radiation amount of the wireless power transmission device 810 at a first resonant frequency shows that the θ component gain 1610 is reduced by 17.6 dB and the Φ component gain 1620 is reduced by 16.3 dB. Here, the wireless power transmission device 810 may verify that a transverse electric/transverse magnetic (TE/TM) base mode component is not removed at the second resonant frequency.

Figure 17:
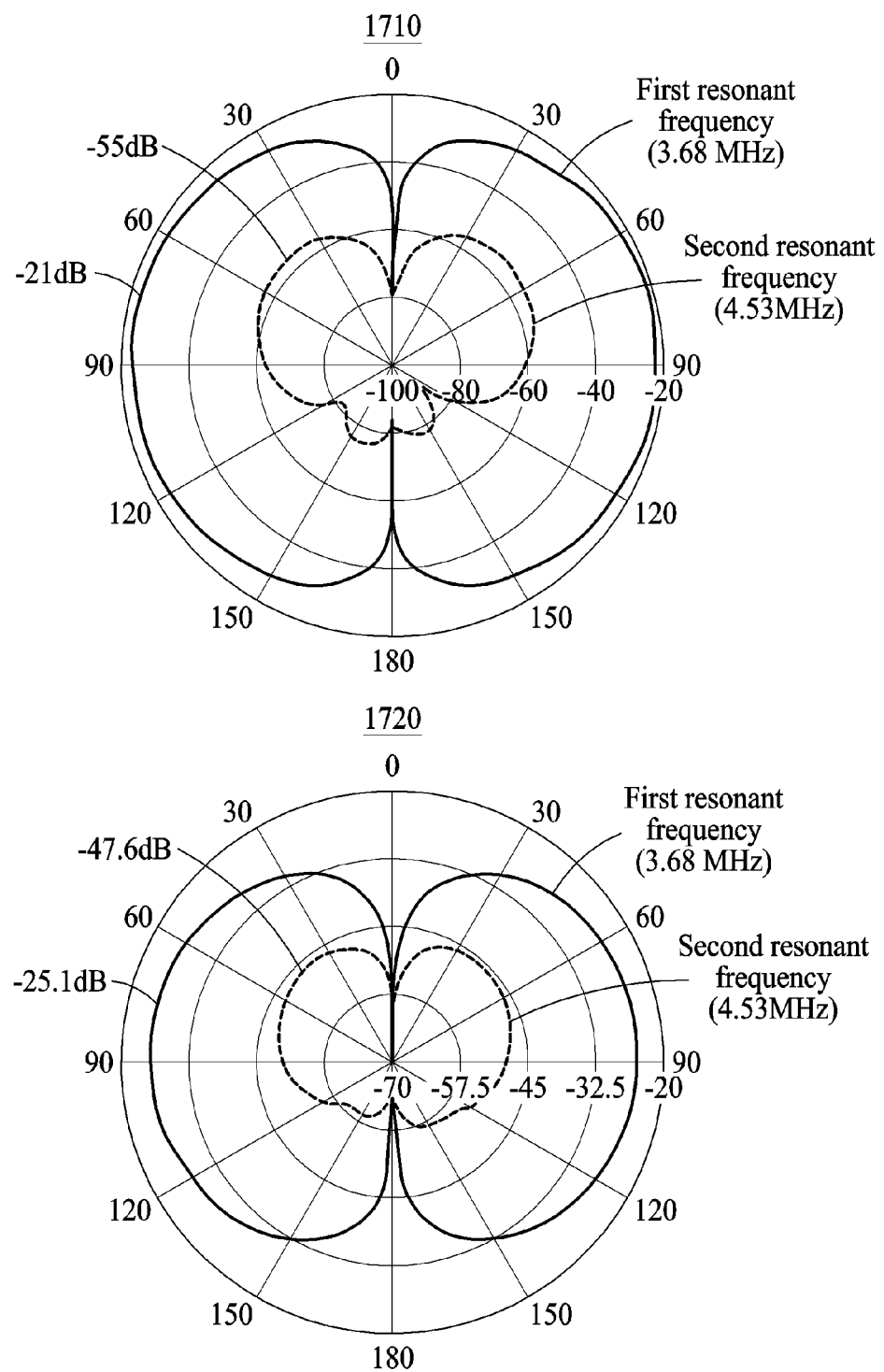
FIG. 17 illustrates examples of a realized gain of the wireless power transmission device of FIG. 13 according to an example embodiment.

FIG. 17 illustrates examples of a realized gain of the wireless power transmission device of FIG. 13 according to an example embodiment.

FIG. 17 illustrates a realized gain when a transmission distance of the wireless power transmission device 1010 of the implementation example 1310 is equal to a width of a coil. In detail, FIG. 17 illustrates a θ component gain 1710 and a Φ component gain 1720.

Compared to a radiation amount of the wireless power transmission device 1010 of the implementation example 1310 at a second resonant frequency, a radiation amount of the wireless power transmission device 1010 of the implementation example 1310 at a first resonant frequency shows that the θ component gain 1710 is reduced by 34 dB and the Φ component gain 1720 is reduced by 22.5 dB.

Here, the wireless power transmission device 1010 of the implementation example 1310 may verify that a TE/TM mode component is removed at the second resonant frequency. In the case of using the wireless power transmission device 1010 of the implementation example 1310 at the second resonant frequency at which an amount of space radiation is small, it is possible to provide an electromagnetic wave environment in which interference is minimized. It is possible to minimize a malfunction of another communication device or electronic device during the power transmission of the wireless power transmission device 1010.

Figure 18:
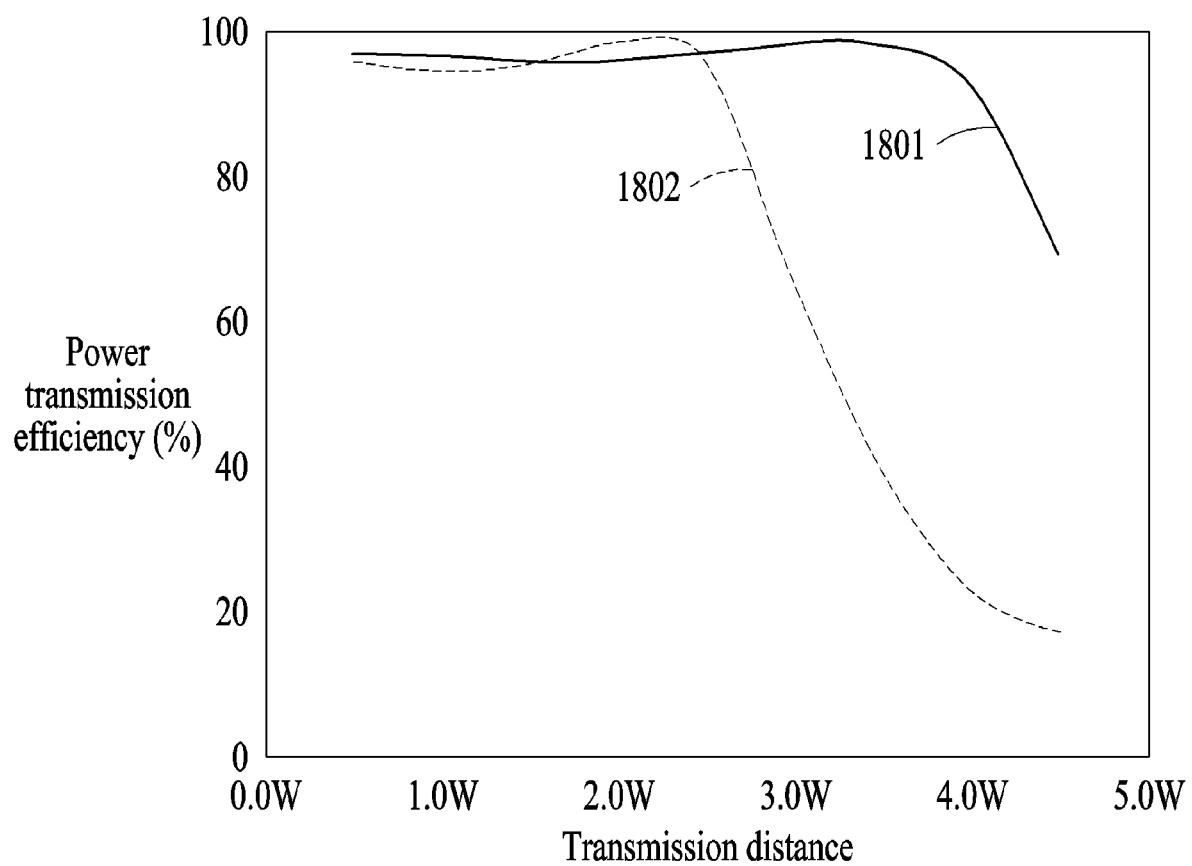
FIG. 18 is a graph showing a power transmission efficiency of the wireless power transmission device of FIG. 8 and a power transmission efficiency of the wireless power transmission device of FIG. 13 according to an example embodiment.

FIG. 18 is a graph showing a power transmission efficiency of the wireless power transmission device of FIG. 8 and a power transmission efficiency of the wireless power transmission device of FIG. 13 according to an example embodiment.

FIG. 18 illustrates a power transmission efficiency 1801 of the wireless power transmission device 1010 of the implementation example 1310 and a power transmission efficiency 1802 of the wireless power transmission device 810. Here, W denotes a width of a coil and a transmission distance is indicated based on W.

The power transmission efficiencies 1801 and 1802 are power transmission efficiencies when all of load impedance of the wireless power receiving device are 20 ohms. Also, all of the conductive lines of the wireless power transmission device 810 the wireless power transmission device 1010 are assumed as a perfect conductor.

Comparing the power transmission efficiency 1801 and the power transmission efficiency 1802, a transmission efficiency according to a transmission distance of the power transmission efficiency 1801 is greater than that of the power transmission efficiency 1802. In detail, referring to the power transmission efficiency 1801, a power transmission efficiency of 70% or more is maintained up to a maximum transmission distance of 4.5 W.

When the wireless power transmission device 1010 of the implementation example 1310 is manufactured using a metal, for example, copper, aluminum, and silver, the transmission distance may be slightly reduced compared to that of the power transmission efficiency 1801 due to an internal resistance loss.

Figure 19:
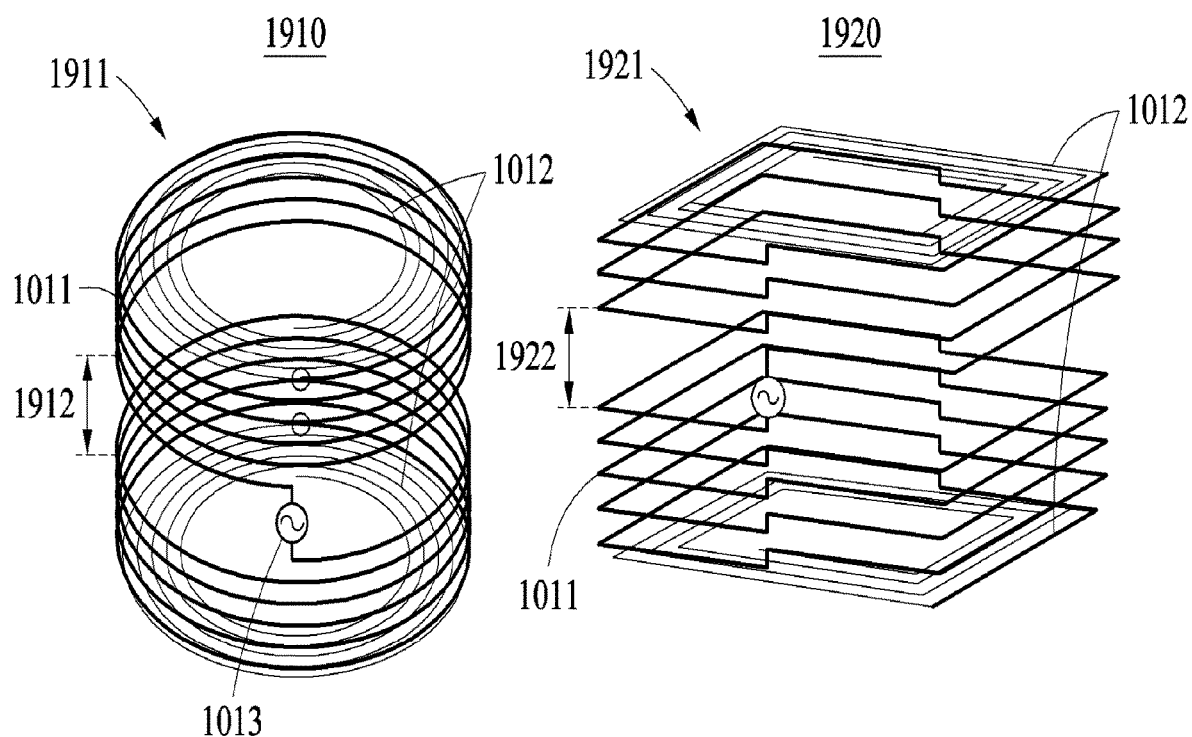
FIG. 19 illustrates examples of a wireless power transmission device according to an example embodiment.

FIG. 19 illustrates examples of a wireless power transmission device according to an example embodiment.

FIG. 19 illustrates a first implementation example 1910 and a second implementation example 1920. The first implementation example 1910 includes a wireless power transmission device 1911, the first coil 1011, the second coil 1012, the voltage source 1013, and a gap area 1912. The second implementation example 1920 includes a wireless power transmission device 1921, the first coil 1011, the second coil 1012, the voltage source 1013, and a gap area 1922.

The gap area 1912, 1922 refers to an area in which an interval between conductive lines constituting the first coil 1011 is relatively wide. That is, an interval between conductive lines present in the gap area 1912, 1922 is relatively wide compared to an interval between conductive lines provided in another portion of the first coil 1011. Although FIG. 19 illustrates only a single gap area 1912, 1922, the wireless power transmission device 1911, 1921 may include a plurality of gap areas 1912, 1922. Also, the gap area 1912, 1922 may not be provided at the center of the first coil 1011.

In an example in which the gap area 1912, 1922 is provided at a center point of the wireless power transmission device 1911, 1921, energy of an electric field stored outside increases compared to that of the electric field stored inside. In this example, self-capacitance of the wireless power transmission device 1911, 1921 may decrease and mutual-capacitance thereof may increase. The difference between the first resonant frequency and the second resonant frequency according to Equation 7 and Equation 8 may increase. Accordingly, a coupling amount of the wireless power transmission device 1911, 1921 may increase.

Figure 20:
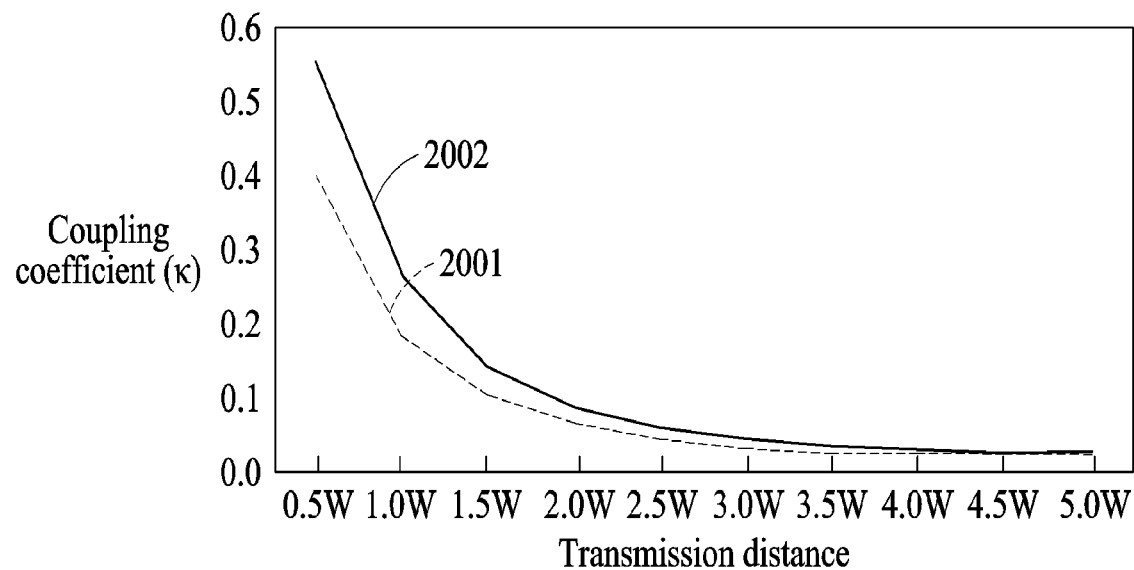
FIG. 20 illustrates a graph showing a coupling coefficient of the wireless power transmission device of FIG. 13 and a coupling coefficient of the wireless power transmission device of FIG. 19 and a graph showing an inverse number of the coupling coefficient of the wireless power transmission device of FIG. 13 and an inverse number of the coupling coefficient of the wireless power transmission device of FIG. 19 according to an example embodiment.
Figure 20:
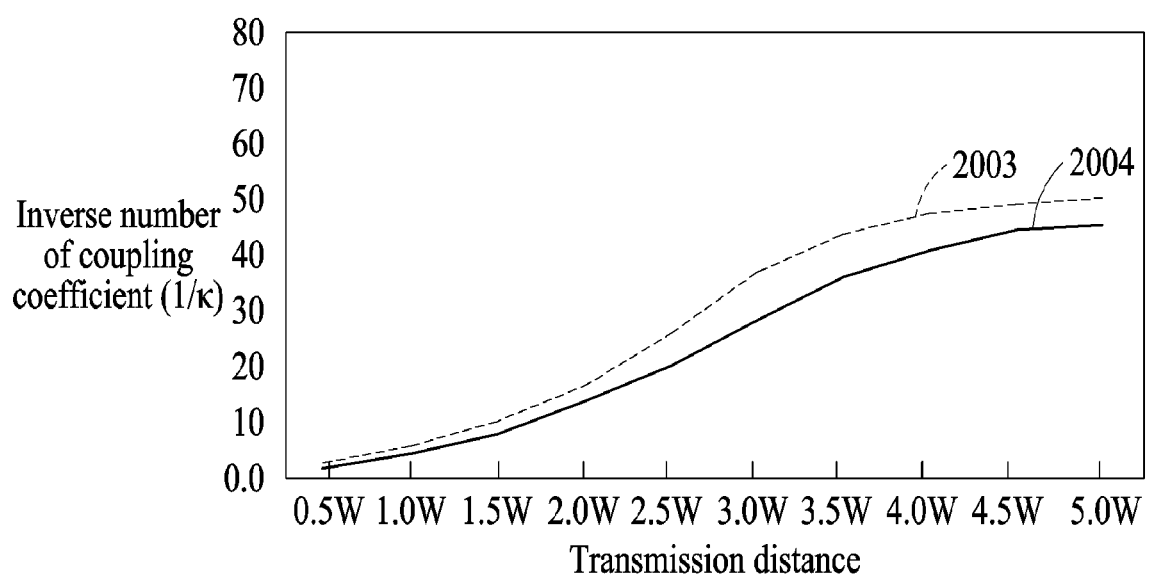

FIG. 20 illustrates a graph showing a coupling coefficient of the wireless power transmission device of FIG. 13 and a coupling coefficient of the wireless power transmission device of FIG. 19 and a graph showing an inverse number of the coupling coefficient of the wireless power transmission device of FIG. 13 and an inverse number of the coupling coefficient of the wireless power transmission device of FIG. 19 according to an example embodiment.

FIG. 20 illustrates a coupling coefficient 2001 of the implementation example 1310, a coupling coefficient 2002 of the second implementation example 1920, an inverse number 2003 of the coupling coefficient of the implementation example 1310, and an inverse number 2004 of the coupling coefficient of the second implementation example 1920.

Comparing the coupling coefficient 2001 and the coupling coefficient 2002, it can be known that the second implementation example 1920 has a relatively high coupling coefficient compared to that of the implementation example 1310. That is, due to the effect of the gap area 1922, it can be known that a coupling amount of the second implementation example 1920 increases. Accordingly, a power transmission distance of the second implementation example 1920 is greater than that of the implementation example 1310.

Comparing the inverse number 2003 and the inverse number 2004, it can be known that the second implementation example 1920 has a relatively lower inverse number of a coupling coefficient compared to that of the implementation example 1310 from an aspect that the coupling coefficient 2001, 2002 and the inverse number 2003, 2004 thereof have a mutual inverse number relationship.

Figure 21:
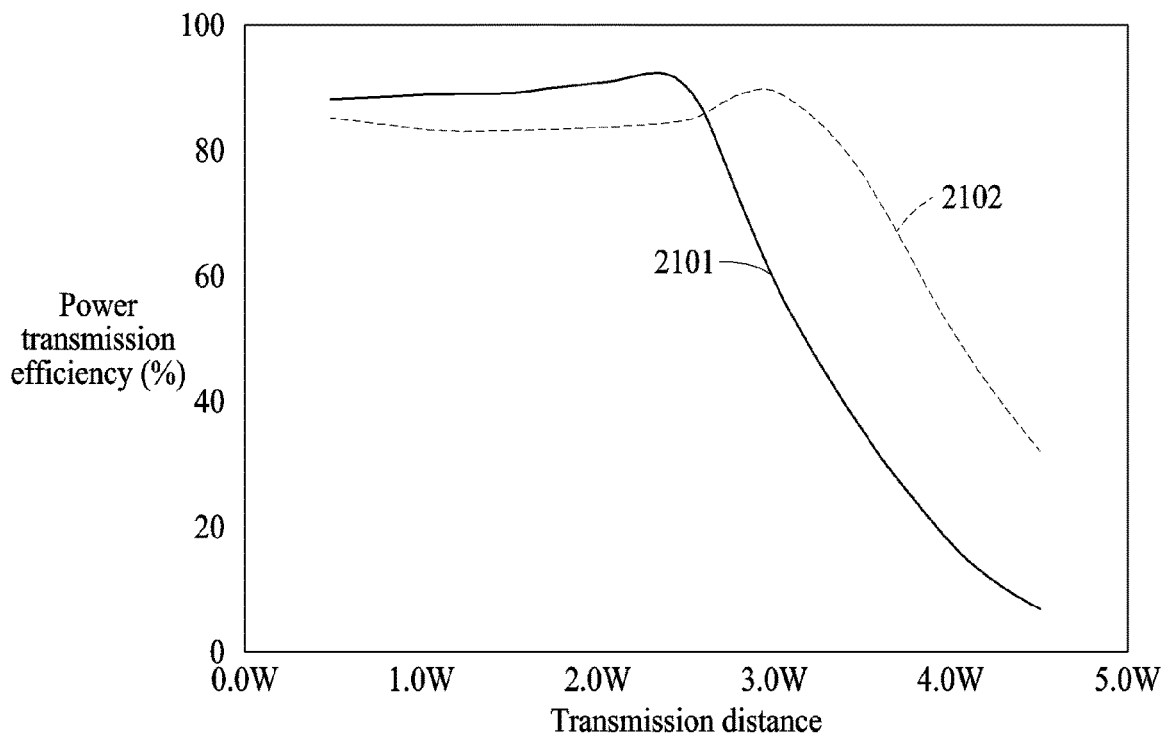
FIG. 21 is a graph showing a power transmission efficiency of the wireless power transmission device of FIG. 8 and a power transmission efficiency of the wireless power transmission device of FIG. 19 according to an example embodiment.

FIG. 21 is a graph showing a power transmission efficiency of the wireless power transmission device of FIG. 8 and a power transmission efficiency of the wireless power transmission device of FIG. 19 according to an example embodiment.

FIG. 21 illustrates a power transmission efficiency 2101 of the wireless power transmission device 810 and a power transmission efficiency 2102 of the wireless power transmission device 1921. Here, load impedance of the wireless power receiving device is set as 20 ohms.

Load impedance of a wireless power receiving device (not shown) corresponding to the wireless power transmission device 1921 is set as 40 ohms. Copper is used for all of the conductive lines.

Comparing the power transmission efficiency 2101 and the power transmission efficiency 2102, it can be known that the power transmission efficiency 2102 has a relatively excellent transmission efficiency characteristic compared to the power transmission efficiency 2101 although the load impedance of the power transmission efficiency 1921 is 40 ohms twice as great as that of the wireless power receiving device, that is, 20 ohms. Since the load impedance may be set to be high, the wireless power transmission device 1921 manufactured using a metal may reduce a resistance loss.

Figure 22:
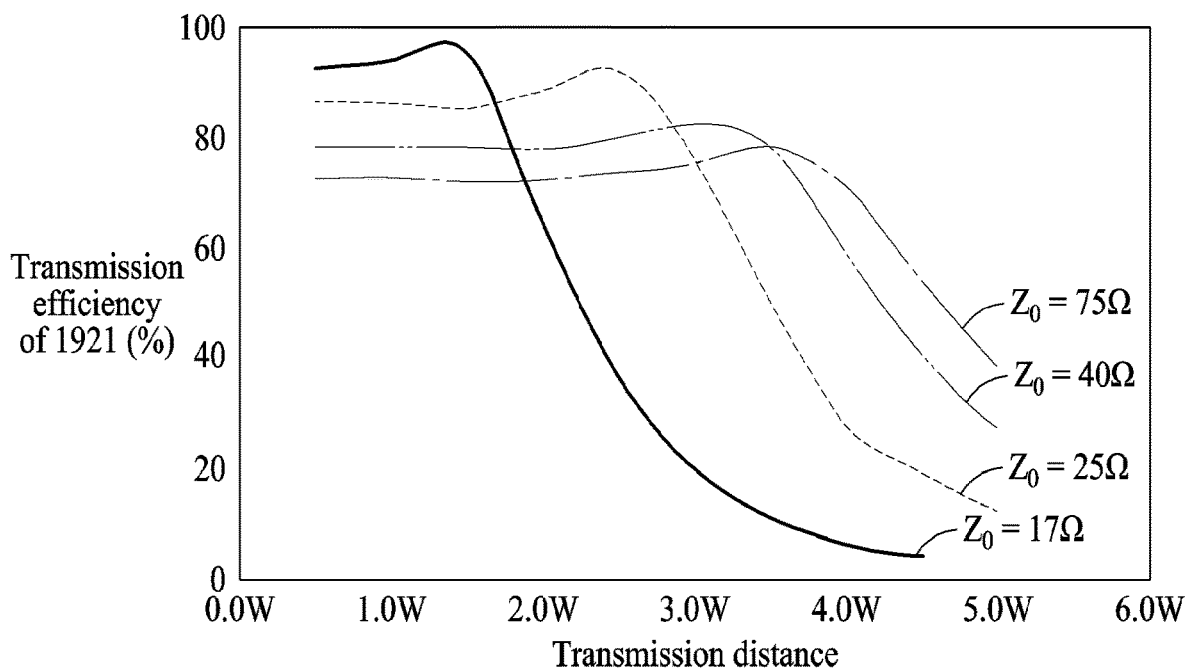
FIG. 22 is a graph showing a power transmission efficiency of the wireless power transmission device of FIG. 19 based on load impedance and a transmission distance according to an example embodiment.

FIG. 22 is a graph showing a power transmission efficiency of the wireless power transmission device of FIG. 19 based on load impedance and a transmission distance according to an example embodiment.

The graph of FIG. 22 shows the power transmission efficiency of the wireless power transmission device 1921 according to load impedance and a transmission distance.

Referring to the graph, when the load impedance is 17 ohms, the wireless power transmission device 1921 has the power transmission efficiency of 70% in a distance of 2 W.

The methods according to the example embodiments may be provided in a program executable on a computer and may be configured in various non-transitory computer-readable recording media, for example, magnetic storage media, optical media, and digital storage media.

Implementations of various techniques described herein may be configured using a digital electronic circuitry or computer hardware, firmware, software, or combinations thereof. The implementations may be configured as an embodied computer program in a computer program product, i.e., an information carrier, for example, a machine-readable storage device (non-transitory computer readable media) or an electric wave to perform processing by an operation of a data processing device, for example, a programmable processor, a computer, or a plurality of computers, or to control the operation. A computer program, such as the aforementioned computer program(s) may be recorded as a predetermined programming language including compiled or interpreted languages, and may be included as an independent program or a module, a component, a subroutine, or another unit suitable for a computing environment. The computer program may be processed on a single computer or a plurality of computers at a single site or may be distributed over a plurality of sites and may be connected through a communication network.

Processors suitable for processing of the computer program include, for example, one or more general-purpose and special purpose microprocessors and one or processors of a predetermined type of digital computer. In general, the processor may receive instructions and data from one or more of read only memory (ROM) and random access memory (RAM). Computer elements may include at least one processor configured to execute instructions and one or more memory devices configured to store instructions and data. In general, the computer may include one or more mass storage devices, for example, magnetic disks, magnetic-optical disks, or optical disks, configured to store data, or may receive or transmit data from or to the one or more mass storage devices, or may be coupled to perform both transmission and reception. Examples of information carriers suitable to embody computer program instructions and data may include semiconductor memory devices, for example, magnetic media such as hard disks, floppy disks, and magnetic tapes; optical media such as compact disk read only memory (CD-ROM) and digital video disk (DVD); magneto-optical media such as floptical disk; and ROM, RAM, a flash memory, erasable programmable ROM (EPROM), and electrically erasable programmable ROM (EEPROM). The processor and the memory may be assisted by a special-purpose logic circuitry or may be included therein.

In addition, non-transitory computer-readable media may be computer-accessible media and may include computer storage media and transmission media.

Although the present speciation includes details of a plurality of specific implementations, they should not be understood to limit the scope of the present disclosure or the claims and should be understood to describe features of a specific implementation. Features described in the context of individual implementations may be configured through combinations thereof. On the contrary, various features described in the context of the individual implementations may be configured individually or through appropriate lower combinations thereof. Further, although the features may operate in a specific combination and may operate as claimed, one or more features from the claimed combination may be excluded from the combination in some instances. The claimed combination may be changed with the lower combination or modification thereof.

Likewise, although operations are illustrated in specific order in the drawings, it should not be understood that the operations should be performed in the illustrated specific order or sequential order to achieve a desirable result or that all of the illustrated operations should be performed. In some instances, multitasking and parallel processing may be advantageous. Also, separation of various device components in the example embodiments should not be understood to be required in all of the example embodiments. The aforementioned program components and devices may be integrated with a single software to product or may be packaged into a multi-software product.

Meanwhile, the example embodiments disclosed in the present specification and the drawings are provided to help the understanding and not provided to limit the scope of the present disclosure. In addition to the example embodiments, it will be apparent to that of ordinary skill in the art that various modifications may be made without departing from the technical sprit of the disclosure.

EXPLANATION OF SYMBOLS

110: wireless power transmission device
120: wireless power receiving device

What is claimed is:

1. A wireless power transmission device for transmitting power to a wireless power receiving device, comprising:
    a first coil provided in a first direction;
    a second coil provided in a second direction that is perpendicular to the first direction, and connected to both ends of the first coil; and
    a voltage source configured to supply voltage to the first coil and the second coil,
    wherein the first coil and the second coil generate an electric field and a magnetic field in response to the voltage being supplied from the voltage source.

2. The wireless power transmission device of claim 1, wherein the first coil includes a conductive line that is wound a plurality of turns in the first direction, and
    the second coil includes a conductive line that is wound a plurality of turns toward a center of the first coil in the second direction.

3. The wireless power transmission device of claim 2, wherein the first coil includes a gap area that is an area in which an interval between conductive lines constituting the first coil is relatively greater than an interval between conductive lines provided in another portion.

4. The wireless power transmission device of claim 3, wherein the voltage source is connected to a conductive line which configures the gap area.

5. The wireless power transmission device of claim 1, wherein the first coil includes a conductive line that is wound a plurality of turns in a circular shape in the first direction, and
    the second coil includes a conductive line that is wound a plurality of turns in a circular shape toward a center of the first coil in the second direction.

6. The wireless power transmission device of claim 1, wherein the first coil includes a conductive line that is wound a plurality of turns in a rectangular shape in the first direction, and
    the second coil includes a conductive line that is wound a plurality of turns in a rectangular shape toward a center of the first coil in the second direction.

7. The wireless power transmission device of claim 1, wherein the voltage source is connected to the first coil and configured to supply the voltage to the first coil and the second coil through the first coil.

8. The wireless power transmission device of claim 1, further comprising:
    a voltage supply loop separate from the first coil and the second coil and provided on a plane parallel to the second coil,
    wherein the voltage source is connected to the voltage supply loop and configured to supply the voltage to the voltage supply loop.

9. The wireless power transmission device of claim 8, wherein the voltage supply loop is configured to generate the magnetic field and to indirectly supply the voltage to the first coil and the second coil in response to the voltage being supplied from the voltage source.

10. A wireless power receiving device for receiving power from a wireless power transmission device, comprising:
    a first coil provided in a first direction;
    a second coil provided in a second direction that is perpendicular to the first direction, and connected to both ends of the first coil; and
    a load configured to be supplied with voltage from the first coil and the second coil,
    wherein the first coil and the second coil are configured to supply the voltage to the load in response to the voltage being received from the wireless power transmission device.

11. The wireless power receiving device of claim 10, wherein the first coil includes a conductive line that is wound a plurality of turns in the first direction, and
    the second coil includes a conductive line that is wound a plurality of turns toward a center of the first coil in the second direction.

12. The wireless power receiving device of claim 11, wherein the first coil includes a gap area that is an area in which an interval between conductive lines constituting the first coil is relatively greater than an interval between conductive lines provided in another portion.

13. The wireless power receiving device of claim 12, wherein the load is connected to a conductive line which configures the gap area.

14. The wireless power receiving device of claim 10, wherein the first coil includes a conductive line that is wound a plurality of turns in a circular shape in the first direction, and
   the second coil includes a conductive line that is wound a plurality of turns in a circular shape toward a center of the first coil in the second direction.

15. The wireless power receiving device of claim 10, wherein the first coil includes a conductive line that is wound a plurality of turns in a rectangular shape in the first direction, and
   the second coil includes a conductive line that is wound a plurality of turns in a rectangular shape toward a center of the first coil in the second direction.

16. The wireless power receiving device of claim 10, wherein the load is connected to the first coil and configured to be supplied with the voltage from the first coil and the second coil through the first coil.

17. The wireless power receiving device of claim 10, further comprising:
   a voltage receiving loop separate from the first coil and the second coil and provided on a plane parallel to the second coil,
   wherein the load is connected to the voltage receiving loop and configured to be supplied with the voltage from the voltage receiving loop.

18. The wireless power receiving device of claim 17, wherein the voltage receiving loop is configured to be supplied with the voltage from the first coil and the second coil in response to the first coil and the second coil receiving the power from the wireless power transmission device and generating a magnetic field.

* * * * *